(12) United States Patent
Kim et al.

(10) Patent No.: US 12,124,105 B2
(45) Date of Patent: Oct. 22, 2024

(54) LENS DRIVING UNIT, CAMERA MODULE, AND OPTICAL INSTRUMENT

(71) Applicant: LG Innotek Co., Ltd., Seoul (KR)

(72) Inventors: Jung Cheol Kim, Seoul (KR); Jin Suk Han, Seoul (KR); Sang Ok Park, Seoul (KR); Sang Jun Min, Seoul (KR); Byung Wook Son, Seoul (KR); Kyoung Ho Yoo, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/364,713

(22) Filed: Aug. 3, 2023

(65) Prior Publication Data

US 2024/0019662 A1    Jan. 18, 2024

Related U.S. Application Data

(63) Continuation of application No. 17/452,187, filed on Oct. 25, 2021, now Pat. No. 11,754,802, which is a
(Continued)

(30) Foreign Application Priority Data

Aug. 31, 2015  (KR) .......................... 10-2015-0123072
Sep. 24, 2015  (KR) .......................... 10-2015-0135359

(51) Int. Cl.
*G02B 7/08*     (2021.01)
*G02B 27/64*    (2006.01)
(Continued)

(52) U.S. Cl.
CPC ............. *G02B 7/08* (2013.01); *G02B 27/646* (2013.01); *G03B 3/10* (2013.01); *G03B 5/00* (2013.01);
(Continued)

(58) Field of Classification Search
CPC ...... G02B 7/08; G02B 27/646; H04N 23/687; H04N 23/54; H04N 23/57; H04N 23/55; G03B 3/10; G03B 5/00
(Continued)

(56) References Cited

U.S. PATENT DOCUMENTS

2009/0015948 A1   1/2009   Wada et al.
2014/0327965 A1   11/2014  Chen et al.
(Continued)

FOREIGN PATENT DOCUMENTS

CN    101210992 A    7/2008
CN    101430602 A    5/2009
(Continued)

OTHER PUBLICATIONS

Office Action dated Jan. 25, 2022 in Chinese Application No. 202011338250.8.
(Continued)

*Primary Examiner* — Joel W Fosselman
(74) *Attorney, Agent, or Firm* — Saliwanchik, Lloyd & Eisenschenk

(57)    ABSTRACT

The present embodiment relates to a lens driving device comprising: a housing; a bobbin disposed inside the housing; a magnet disposed in the housing; a first coil which is disposed in the bobbin, and is opposite to the magnet; a base disposed on the lower side of the housing; a substrate portion comprising a body portion, which is disposed on the upper surface of the base, and a terminal portion extending toward the lower side of the body portion; a terminal portion accommodating portion which is formed on a side surface of the base and accommodates at least a part of the terminal portion; and an adhesive accommodating groove which is formed in the terminal portion accommodating portion and accommodates at least a part of an adhesive contacting the
(Continued)

terminal portion and the terminal portion accommodating portion.

20 Claims, 10 Drawing Sheets

Related U.S. Application Data continuation of application No. 16/743,840, filed on Jan. 15, 2020, now Pat. No. 11,181,806, which is a continuation of application No. 15/756,484, filed as application No. PCT/KR2016/009679 on Aug. 31, 2016, now Pat. No. 10,574,868.

(51) Int. Cl.
| | |
|---|---|
| *G03B 3/10* | (2021.01) |
| *G03B 5/00* | (2021.01) |
| *H04N 23/54* | (2023.01) |
| *H04N 23/55* | (2023.01) |
| *H04N 23/57* | (2023.01) |
| *H04N 23/68* | (2023.01) |

(52) U.S. Cl.
CPC ............. *H04N 23/54* (2023.01); *H04N 23/55* (2023.01); *H04N 23/57* (2023.01); *H04N 23/687* (2023.01); *G03B 2205/0007* (2013.01); *G03B 2205/0069* (2013.01)

(58) Field of Classification Search
USPC ..................................................... 348/208.11
See application file for complete search history.

(56) References Cited

U.S. PATENT DOCUMENTS

| | | | | |
|---|---|---|---|---|
| 2014/0355120 | A1* | 12/2014 | Yeo | ....................... G02B 13/001 359/557 |
| 2016/0182775 | A1 | 6/2016 | Cho et al. | |

FOREIGN PATENT DOCUMENTS

| | | |
|---|---|---|
| CN | 101610358 A | 12/2009 |
| CN | 101860166 A | 10/2010 |
| CN | 101872056 A | 10/2010 |
| CN | 102160240 A | 8/2011 |
| CN | 102315748 A | 1/2012 |
| CN | 102338921 A | 2/2012 |
| CN | 102789037 A | 11/2012 |
| CN | 202710823 U | 1/2013 |
| CN | 103095974 A | 5/2013 |
| CN | 103125004 A | 5/2013 |
| CN | 203026690 U | 6/2013 |
| CN | 103226233 A | 7/2013 |
| CN | 103676067 A | 3/2014 |
| CN | 104216199 A | 12/2014 |
| CN | 104238069 A | 12/2014 |
| CN | 104460180 A | 3/2015 |
| CN | 104570547 A | 4/2015 |
| CN | 104730678 A | 6/2015 |
| CN | 204405924 U | 6/2015 |
| CN | 104793440 A | 7/2015 |
| CN | 104808416 A | 7/2015 |
| CN | 104902149 A | 9/2015 |
| EP | 2 887 514 A2 | 6/2015 |
| EP | 2 899 579 A2 | 7/2015 |
| JP | 2012-88477 A | 5/2012 |
| JP | 2013-24938 A | 2/2013 |
| KR | 10-2007-0042419 A | 4/2007 |
| KR | 10-2008-0046068 A | 5/2008 |
| KR | 10-2011-0029345 A | 3/2011 |
| KR | 10-1079026 B1 | 11/2011 |
| KR | 10-2012-0133161 A | 12/2012 |
| KR | 10-2013-0132089 A | 12/2013 |
| KR | 10-2015-0042681 A | 4/2015 |

OTHER PUBLICATIONS

Office Action dated Feb. 8, 2022 in Chinese Application No. 202011343372.6.
Office Action dated Feb. 16, 2022 in Chinese Application No. 202011342981.X.
Office Action dated Apr. 15, 2022 in Korean Application No. 10-2015-0123072.
International Search Report in International Application No. PCT/KR2016/009679, filed Aug. 31, 2016.
Restriction Requirement dated Jun. 24, 2019 in U.S. Appl. No. 15/756,484.
Notice of Allowance dated Oct. 15, 2019 in U.S. Appl. No. 15/756,484.
Office Action dated Apr. 7, 2021 in U.S. Appl. No. 16/743,840.
Notice of Allowance dated Jul. 23, 2021 in U.S. Appl. No. 16/743,840.
Office Action dated Jun. 29, 2022 in Chinese Application No. 202011338250.8.
Office Action dated Sep. 26, 2022 in Chinese Application No. 202011343372.6.
Office Action dated Sep. 27, 2022 in Chinese Application No. 202011342981.X.
Office Action dated Sep. 27, 2022 in Chinese Application No. 202011338250.8.
Office Action dated Aug. 22, 2022 in Korean Application No. 10-2015-0135359.
Office Action dated Feb. 10, 2023 in Chinese Application No. 202011343372.6.
Office Action dated Feb. 25, 2023 in Chinese Application No. 202011342981.X.
Office Action dated May 15, 2023 in Chinese Application No. 202011343372.6.
Office Action dated Sep. 18, 2023 in Korean Application No. 10-2023-0009768.
Office Action dated Dec. 13, 2023 in Korean Application No. 10-2023-0067943.

* cited by examiner

LENS DRIVING UNIT, CAMERA MODULE, AND OPTICAL INSTRUMENT

CROSS-REFERENCE TO RELATED APPLICATIONS

This application is a continuation of U.S. application Ser. No. 17/452,187, filed Oct. 25, 2021; which is a continuation of U.S. application Ser. No. 16/743,840, filed Jan. 15, 2020, now U.S. Pat. No. 11,181,806, issued Nov. 23, 2021; which is a continuation of U.S. application Ser. No. 15/756,484, filed Feb. 28, 2018, now U.S. Pat. No. 10,574,868, issued Feb. 25, 2020; which is the U.S. national stage application of International Patent Application No. PCT/KR2016/009679, filed Aug. 31, 2016, which claims priority to Korean Application Nos. 10-2015-0123072, filed Aug. 31, 2015; and 10-2015-0135359, filed Sep. 24, 2015; the disclosures of each of which are incorporated herein by reference in their entirety.

TECHNICAL FIELD

The teachings in accordance with exemplary and non-limiting embodiments of this invention relate generally to a lens driving unit, a camera module, and an optical instrument.

BACKGROUND ART

This section provides background information related to the present disclosure, which is not necessarily prior art.

Concomitant with widely generalized dissemination of various mobile terminals and commercialization of wireless Internet services, demands by consumers related to mobile terminals are diversified to prompt various types of circumferential devices or additional equipment to be mounted on mobile terminals. Inter alia, camera modules may be representative items photographing an object in a still picture or a video.

Meanwhile, the recent camera modules include a lens driving device for auto focus function or handshake correction function. The lens driving device thus mentioned may include therein an FPCB (Flexible Printed Circuit Board) for supplying a power to a driving part inside the lens driving device. However, the conventional lens driving device suffers from disadvantages in that the FPCB is separated in response to environments such as high temperature and high humidity. Furthermore, the conventional lens driving device is configured such that a coil arranged at a bobbin is electrically connected to a spring coupled to the bobbin, where a lead line of coil may be disadvantageously disconnected when the bobbin moves.

DETAILED DESCRIPTION OF THE INVENTION

Technical Subject

Exemplary embodiments of the present invention provide a lens driving device improved in adhesive strength between a substrate part and a base. Furthermore, exemplary embodiments of the present invention provide a camera module and an optical instrument. Furthermore, exemplary embodiments of the present invention provide a lens driving unit, a camera module, and an optical instrument that inhibit coil disconnection due to cantilever when a spring and a lead line of coil are soldered. Furthermore, exemplary embodiments of the present invention provide a lens driving unit, a camera module, and an optical instrument that inhibit in advance generation of structural interference between a leaf spring and a lens driving device when a soldering position between the leaf spring and the lead line changes.

Technical Solution

In one general aspect of the present invention, there is provided a lens driving device comprising: a housing; a bobbin disposed in the housing; a magnet disposed on the housing; a first coil disposed on the bobbin and facing the magnet; a base disposed at a lower side of the housing; a substrate portion comprising a body portion disposed on an upper surface of the base and a terminal portion downwardly extending from the body portion; a terminal portion accommodating portion formed on a lateral surface of the base and accommodating at least a part of the terminal portion; and an adhesive accommodating groove formed on the terminal portion accommodating portion and accommodating at least a part of an adhesive contacting the terminal portion and the terminal portion accommodating portion.

Preferably, but not necessarily, the terminal portion accommodating portion may include a terminal portion accommodating groove disposed with the terminal portion, and a terminal portion support portion protruding from both lateral sides of the terminal portion accommodating groove to an outside.

Preferably, but not necessarily, the adhesive accommodating groove may be formed by being inwardly recessed from a lateral surface of the base forming the terminal portion accommodating groove.

Preferably, but not necessarily, the adhesive accommodating groove may include a plurality of first accommodating grooves formed by being extended to a vertical direction.

Preferably, but not necessarily, the first accommodating groove may be of a bottom-opened type, and may increase in width for at least a part thereof toward a lower side.

Preferably, but not necessarily, the first accommodating groove may be disposed among a plurality of first lugs protruding to an outside over the first accommodating groove, and both lateral surfaces of the first lugs are formed to be round.

Preferably, but not necessarily, the terminal portion support portion may include a first support portion supporting one lateral surface of the terminal portion and a second support portion supporting the other lateral surface of the terminal portion, wherein the adhesive accommodating groove may include a second accommodating groove formed by being extended from the first support portion to the second support portion toward a horizontal direction.

Preferably, but not necessarily, the second accommodating groove, which is of a bottom-opened style, may be formed at a bottom surface at a lateral surface of the base accommodating the terminal portion accommodating groove, or may be formed at an upper surface at a lateral surface of the base.

Preferably, but not necessarily, the second accommodating groove may be formed at an upper surface of a lateral surface at the base and may be formed by a second lug protruding to an outside over the second accommodating groove, wherein an optical direction length of the second lug may correspond to that of the second accommodating groove.

Preferably, but not necessarily, the lens driving device may further comprise a second coil disposed at the substrate portion and opposite to the magnet.

Preferably, but not necessarily, the lens driving device may further comprise:
- a first support member coupled to the housing and the bobbin; and
- a second support member coupled to the first support member and the substrate portion.

Preferably, but not necessarily, the substrate portion may be formed with an FPCB (Flexible Printed Circuit Board), and the terminal portion may be integrally formed with a body portion, and may be formed by being bent from the body portion.

Preferably, but not necessarily, the terminal portion may include a terminal surface, a plurality of terminals formed on a surface of the terminal surface, and a cover layer formed on the terminal surface and on a surface of the terminal to cover a partial area of the terminal surface and the terminal, wherein a length of a border line formed by the cover layer formed on the surface of the terminal and the terminal may be formed to be longer than a width direction length of the terminal.

A camera module according to an exemplary embodiment of the present invention, the camera module comprising: a lens driving device; a PCB disposed at a bottom surface of the lens driving device; and an image sensor coupled to the PCB, wherein the lens driving device comprises: a housing; a bobbin disposed at an inside of the housing; a magnet disposed at the housing; a first coil disposed at the bobbin to be opposite to the magnet; a base disposed at a bottom side of the housing; a body portion disposed at an upper surface of the base; a substrate portion including a terminal portion extended downwardly from the body portion; a terminal portion accommodating portion formed at a lateral surface of the base to accommodate at least a part of the terminal portion; and an adhesive accommodating groove disposed at the terminal portion accommodating portion to accommodate at least a part of an adhesive contacting the terminal portion and the terminal portion accommodating portion.

An optical instrument according to an exemplary embodiment of the present invention, the optical instrument comprising: a lens driving device; a PCB disposed at a bottom surface of the lens driving device; a camera module including an image sensor coupled to the PCB; a main body disposed at the camera module; and a display portion disposed at one surface of the main body to output an image photographed by the camera module, wherein the lens driving device comprises: a housing; a bobbin disposed at an inside of the housing; a magnet disposed at the housing; a first coil disposed at the bobbin to be opposite to the magnet; a base disposed at a bottom side of the housing; a body portion disposed at an upper surface of the base; a substrate portion including a terminal portion downwardly extended from the body portion; a terminal portion accommodating portion formed at a lateral surface of the base to accommodate at least a part of the terminal portion; and an adhesive accommodating groove disposed at the terminal portion accommodating portion to accommodate at least a part of an adhesive adhering the terminal portion and the terminal portion accommodating portion.

The lens driving device according to a first exemplary embodiment of the present invention may include: a base; a body portion disposed at an upper surface of the base; a substrate portion including a terminal portion downwardly extended from the body portion; a terminal portion accommodating portion formed at a lateral side of the base to accommodate at least a part of the terminal portion; and an adhesive accommodating groove formed at the terminal portion accommodating portion to accommodate at least a part of the adhesive adhering the terminal portion and the terminal portion accommodating portion.

Preferably, but not necessarily, the terminal portion accommodating portion may include a terminal portion accommodating portion accommodated with the terminal portion, and a terminal portion support portion disposed at both lateral sides of the terminal portion accommodating portion to support both lateral surfaces of the terminal portion by being protruded to an outside.

Preferably, but not necessarily, the adhesive accommodating groove may be inwardly recessed at a lateral surface of the base forming the terminal portion accommodating portion.

Preferably, but not necessarily, the adhesive accommodating groove may include a plurality of first accommodating grooves formed by being vertically extended.

Preferably, but not necessarily, the first accommodating groove may be bottom-opened and may gradually increase in width at least at a part thereof toward a bottom side.

Preferably, but not necessarily, the first accommodating groove may be disposed among a plurality of first lugs protrusively formed to an outside over the first accommodating groove, wherein both lateral surfaces of the first lug may be formed to be round.

Preferably, but not necessarily, the terminal portion support portion may include a first support portion supporting one lateral surface of the terminal portion, and a second support portion supporting the other lateral surface of the terminal portion, wherein the adhesive accommodating groove may include a second accommodating groove formed by being extended from the first support portion to the second support portion to a horizontal direction.

Preferably, but not necessarily, the second accommodating groove may be of a bottom surface-opened type and disposed at a bottom surface of a lateral surface at the base forming the terminal portion accommodating groove, and may be of an upper-opened type and disposed at an upper surface of a lateral surface at the base.

Preferably, but not necessarily, the second groove accommodating groove may be disposed at an upper surface of a lateral surface at the base, and formed by a second lug protruding to an outside over the second accommodating groove, and the second lug and the second accommodating groove may have a corresponding length to a vertical direction.

Preferably, but not necessarily, the lens driving device may further comprise: a bobbin disposed at an upper side of the base; a housing disposed at an outside of the bobbin to movably support the bobbin; a first driving portion disposed at the bobbin; and a second driving portion disposed at the housing to face the first driving portion.

Preferably, but not necessarily, the lens driving device may further comprise: a housing movably supported to the base; a second driving portion disposed at the housing; and a third driving portion disposed at the substrate portion to face the second driving portion.

Preferably, but not necessarily, the substrate portion may be formed with an FPCB (Flexible Printed Circuit Board), and the terminal portion may be integrally formed with the body portion by being bent.

Preferably, but not necessarily, the terminal portion may include a terminal surface, a plurality of terminals formed at a surface of the terminal surface, and a cover layer formed at the terminal surface and a surface of the terminal to cover the terminal surface and a part of the terminal, wherein a length of a borderline between the cover layer formed on a surface of the terminal and the terminal may be longer than that of a width direction length of the terminal.

The camera module according to a first exemplary embodiment of the present invention may comprise: a base; a body portion disposed at an upper surface of the base; a substrate portion including a terminal downwardly extended from the body portion; a terminal portion accommodating portion formed at a lateral surface of the base to accommodate at least a part of the terminal portion; and an adhesive accommodating groove disposed at the terminal portion accommodating portion to accommodate at least a part of an adhesive adhering the terminal portion and the terminal portion accommodating portion.

An optical instrument according to a first exemplary embodiment of the present invention may comprise: a main body; a display portion disposed at one surface of the main body to display information; and a camera module disposed at the main body to photograph an image or a photograph, wherein the camera module may comprise: a base; a body portion disposed at an upper surface of the base; a substrate portion including a terminal portion downwardly extended from the body portion; a terminal portion accommodating portion formed at a lateral side of the base to accommodate at least a part of the terminal portion; and an adhesive accommodating groove formed at the terminal portion accommodating portion to accommodate at least a part of the adhesive adhering the terminal portion and the terminal portion accommodating portion.

A lens driving device according to a second exemplary embodiment of the present invention may comprise: a housing supporting a magnet; a bobbin disposed at an inside of the housing to move along an optical axis; a first coil disposed at an outer circumferential surface of the bobbin to face the magnet and including a first distal end and a second distal end; a base arranged at a bottom surface of the housing by being spaced apart from the housing as much as a predetermined distance; a second coil arranged between the base and the housing to face the magnet; a coupling portion coupled to the bobbin at an upper surface or a bottom surface of the housing; an elastic member including a first elastic member and a second elastic member to support the bobbin; and a plurality of support members coupled to the housing and the base, wherein the first elastic member includes a first connecting portion electrically connecting the first distal end, and the second elastic member includes a second connecting portion electrically connecting the second distal end, and wherein the first connecting portion is interposed between the coupling portions of the first elastic member coupled to the bobbin, and the second connecting portion is interposed between the coupling portions of the second elastic members coupled to the bobbin.

Preferably, but not necessarily, the plurality of support members may include a first support member and a second support member.

Preferably, but not necessarily, the first elastic member may include a first inner portion and a first outer portion, each coupled to the bobbin, and a first elastic portion connecting the first inner portion and the first outer portion, wherein the second elastic member may include a second inner portion and a second outer portion, each connected to the bobbin, and a second elastic portion connecting the second inner portion and the second outer portion.

Preferably, but not necessarily, the first connecting portion may be arranged at the first inner portion of the first elastic member, and the second connecting portion may be arranged at the second inner portion of the second elastic member.

Preferably, but not necessarily, the first support member may include a third connecting portion electrically connected to the first outer portion, and the second support member may include a fourth connecting portion electrically connected to the second outer portion, and the third connecting portion and the fourth connecting portion are mutually opposed.

Preferably, but not necessarily, the first connecting portion and the second connecting portion may be mutually opposed.

Preferably, but not necessarily, the coupling portion of the first elastic member coupled to the bobbin and the coupling portion of the second elastic member coupled to the bobbin may be more than 3 pieces respectively.

Preferably, but not necessarily, the first connecting portion and the second connecting portion may be arranged at mutually different sides when viewed from an upper surface.

Preferably, but not necessarily, the first outer portion and the second outer portion each corresponding to the first connecting portion and the second connecting portion may be formed with a groove portion respectively.

A camera module according to a second exemplary embodiment of the present invention may comprise: a lens driving device; a lens module allowing an outside light to pass therethrough; and an image sensor disposed at a bottom side of the lens driving device to convert the light having passed the lens module to an electrical signal.

An optical instrument according to a second exemplary embodiment of the present invention may include a camera module.

Advantageous Effects

Through the present invention, an adhesive force of an adhesive to a base can be improved whereby an adhesive force between a substrate portion and the base can be enhanced. Thus, a phenomenon can be inhibited of the substrate portion being separated from the base under high temperature and high moisture environments during adhesive curing works between the substrate portion and the base.

The present invention can obtain an auto focus adjustment function and enhance the product reliability as a result thereof by inhibiting a coil disconnection by changing a position of soldering between a support member and a lead cable.

Furthermore, the present invention can inhibit in advance a structural interference from generation between a support member and a lens driving device to inhibit an erroneous operation and to reduce a rejection rate of products.

BEST MODE

Figure 1:
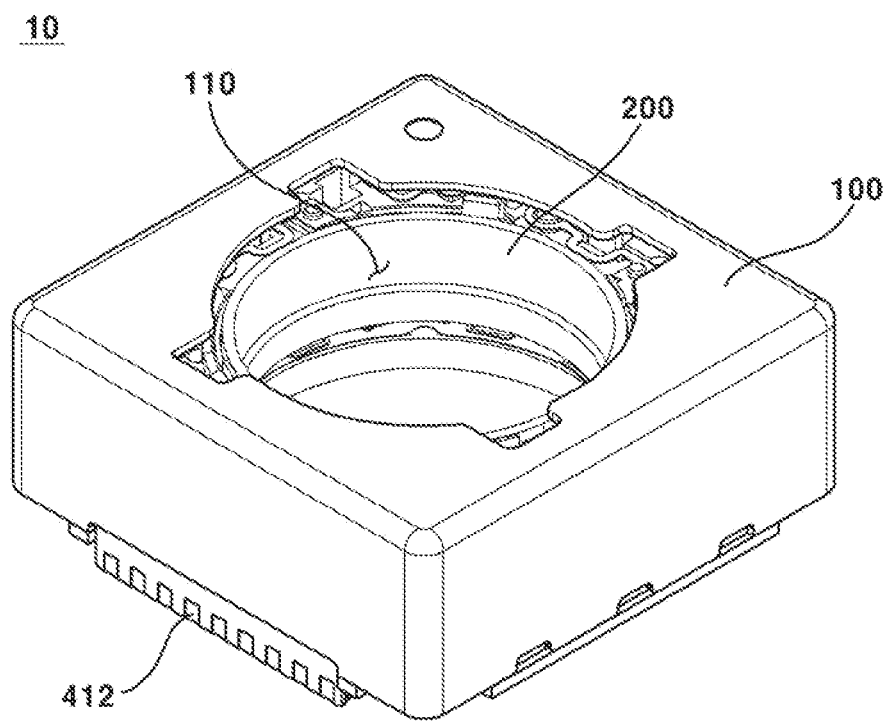
FIG. 1 is a perspective view illustrating a lens driving device according to a first exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter may be defined as an optical axis direction of a lens module in a state of being coupled to a lens driving device. Meantime, the "optical axis direction" may be interchangeably used with a vertical direction and z axis direction.

An "auto focus function" as used hereinafter may be defined as a function of matching a focus relative to an object by adjusting a distance from an image sensor by moving a lens module to an optical axis direction. Meantime, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an external force. Meantime, the "handshake correction" may be interchangeably used with an "OIS (Optical Image Stabilization)".

Now, a configuration of an optical instrument according to a first exemplary embodiment of the present invention will be described hereinafter.

The optical apparatus according to the exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical instrument according to a first exemplary embodiment of the present invention may include a main body (not shown), a display portion (not shown) disposed at one surface of the main body to display information, and a camera (not shown) disposed on the main body to photograph an image or a photograph.

Hereinafter, a configuration of camera module according to a first exemplary embodiment of the present invention will be described.

The camera module may include a lens driving device (10), a lens module (not shown), an infrared cut-off filter (not shown), a PCB (Printed Circuit Board, not shown), and an image sensor (not shown), and may further include a controller (not shown).

The lens module may include one or more lenses (not shown) and a lens barrel accommodating one or more lenses. However, one element of the lens module is not limited by the lens barrel, and any holder structure capable of supporting one or more lenses will suffice. The lens module may move along with the lens driving device (10) by being coupled to the lens driving device (10). The lens module may be coupled to an inside of the lens driving device (10). The lens module may be screw-coupled with a lens driving device (10). The lens module may be coupled to the lens driving device (10) by using an adhesive. Meantime, a light having passed the lens module may be irradiated on an image sensor.

The infrared cut-off filter may serve to inhibit a light of infrared ray region from entering the image sensor. The infrared cut-off filter may be interposed between the lens module and the image sensor. The infrared cut-off filter may be disposed at a holder member (not shown) separately mounted from the base (500). However, the infrared cut-off filter may be installed at a hollow hole (510) formed at a center of a base (500). The infrared cut-off filter may be formed with a film material or a glass material. Meantime, the infrared cut-off filter may be formed by allowing an infrared cut-off coating material to be coated on a plate-shaped optical filter such as an imaging plane protection cover glass or a cover glass.

A PCB (Printed Circuit Board) may support the lens driving device (10). The PCB may be mounted with an image sensor. For example, an upper inner side of the PCB may be disposed with an image sensor, and an upper outside of the PCB may be disposed with a sensor holder (not shown). An upper side of the sensor holder may be disposed with the lens driving device (10). Alternatively, an upper outside of the PCB may be disposed with the lens driving device (10), and an upper inner side of the PCB may be disposed with an image sensor. Through this structure, a light having passed the lens module accommodated inside the lens driving device (10) may be irradiated onto the image sensor mounted on the PCB. The PCB may supply a power to the lens driving device (10). Meantime, the PCB may be disposed with a controller in order to control the lens driving device (10).

The image sensor may be mounted on the PCB. The image sensor may be so disposed as to match the lens module in terms of optical axis, through which the image sensor can obtain a light having passed the lens module. The image sensor may output the irradiated light as an image. The image sensor may be a CCD (charge coupled device), an MOS (metal oxide semi-conductor), a CPD and a CID. However, the types of image sensor may not be limited thereto.

The controller may be mounted on a PCB. The controller may be disposed at an outside of the lens driving device (10). Furthermore, the controller may be also disposed at an inside of the lens driving device (10). The controller may control a direction, intensity and an amplitude of a current supplied to each element of lens driving device (10). The controller may perform any one of an AF function and an OIS function of the camera module by controlling the lens driving device (10). That is, the controller may move the lens module to an optical axis direction or tile the lens module to a direction orthogonal to the optical axis direction by controlling the lens driving device (10). Furthermore, the controller may perform a feedback control of AF function and OIS function. To be more specific, the controller may control a power or a current supplied to a first driving portion (220) to third driving portion (420) by receiving a position of a bobbin (210) or a housing (310) detected by a sensor portion (700).

Hereinafter, configuration of lens driving device (10) will be described in detail with reference to the accompanying drawings.

Figure 2:
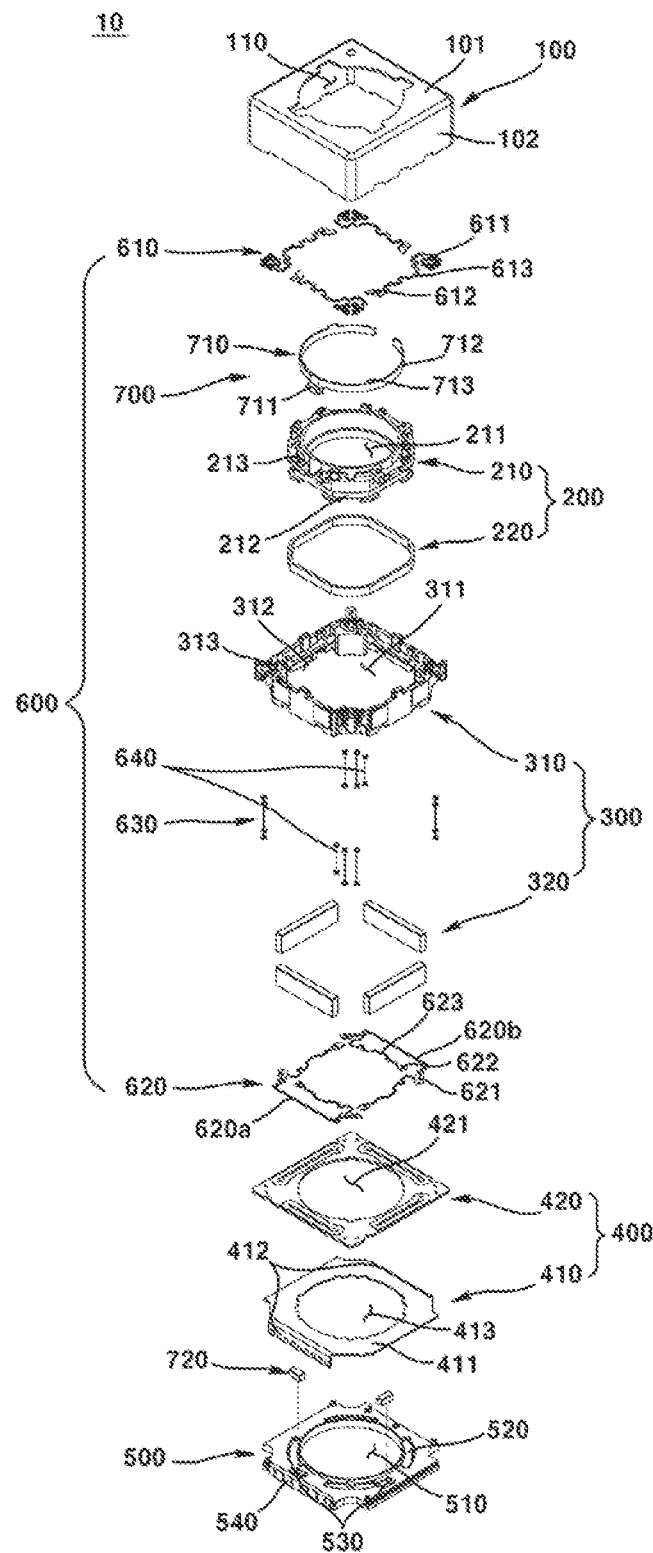
FIG. 2 is an exploded perspective view illustrating a lens driving device according to a first exemplary embodiment of the present invention.
Figure 3:
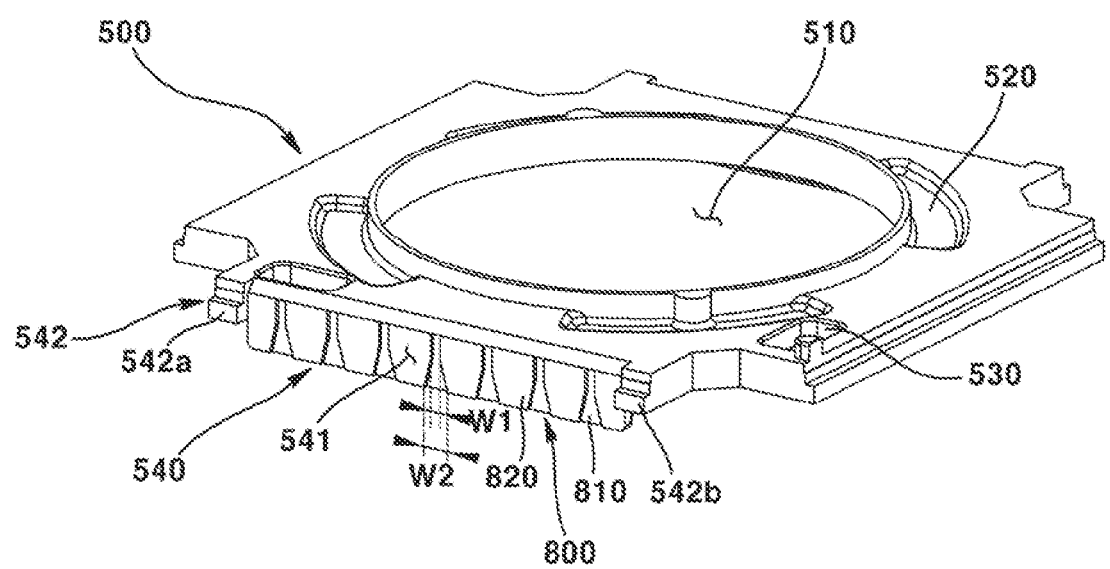
FIG. 3 is perspective view illustrating a lens driving device according to a first exemplary embodiment of the present invention.
Figure 4:
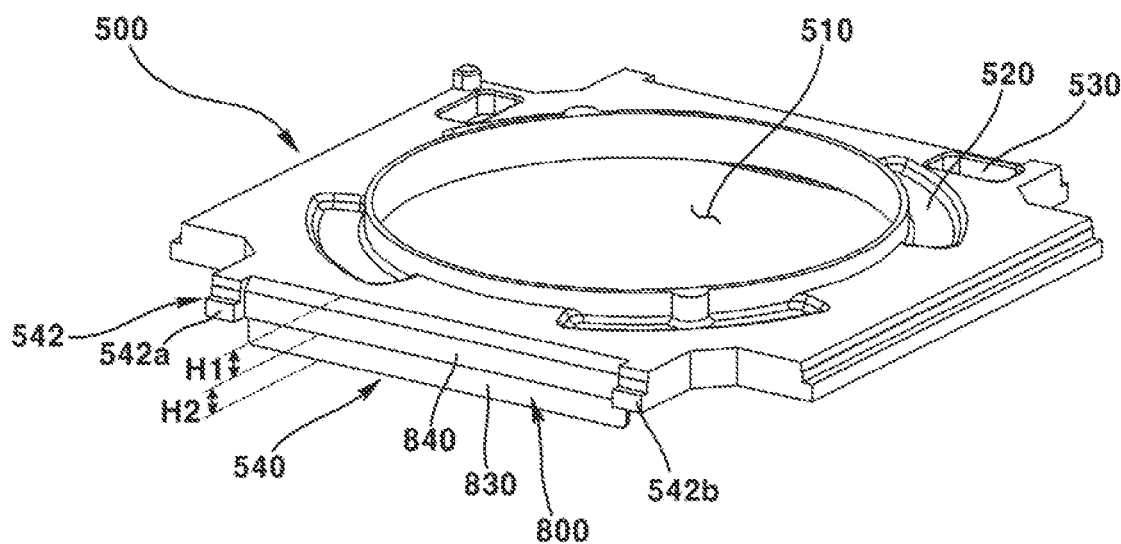
FIG. 4 is a perspective view illustrating a base of a lens driving device according to a modification of a first exemplary embodiment of the present invention.
Figure 5:
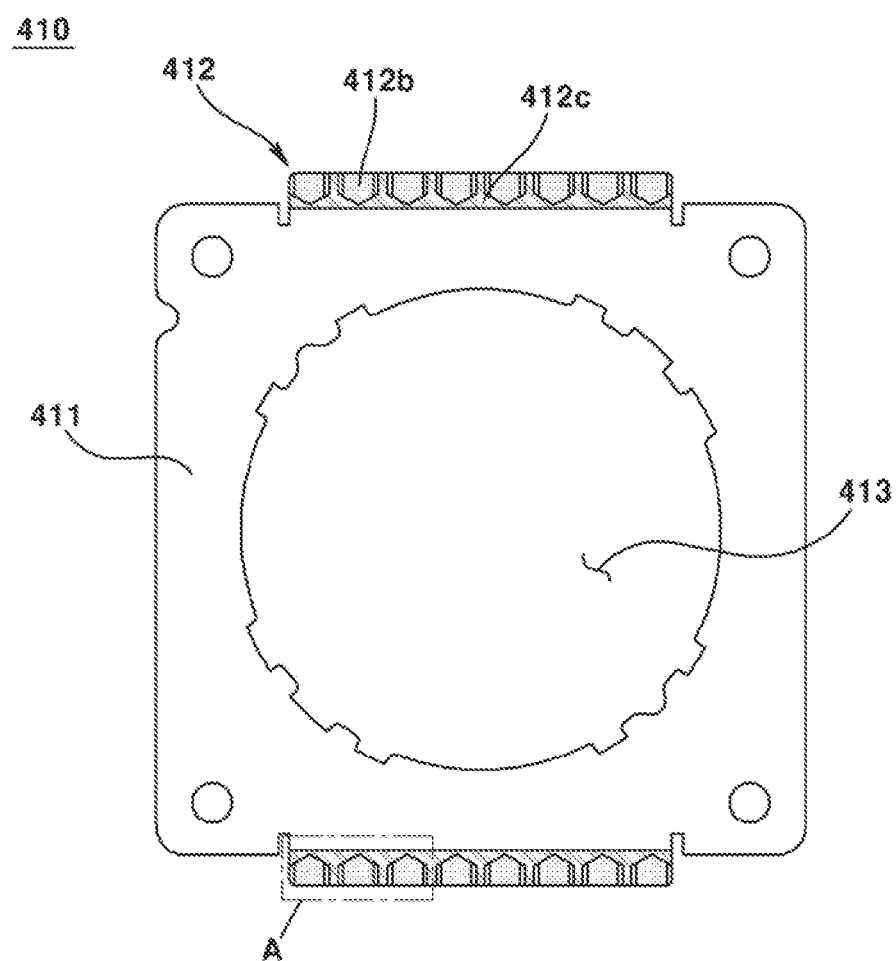
FIG. 5 is a plane view illustrating a substrate portion of a lens driving device according to a first exemplary embodiment of the present invention.
Figure 6:
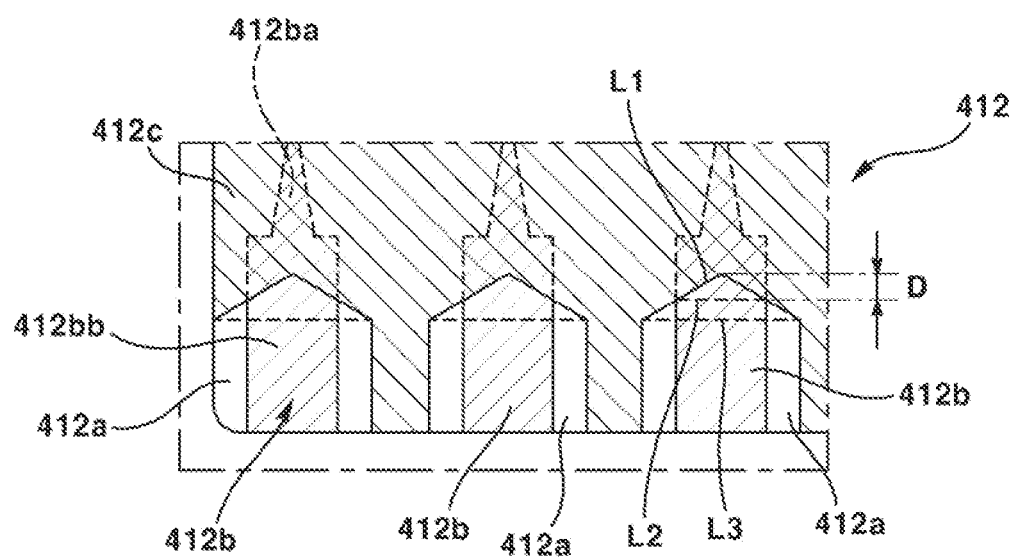
FIG. 6 is a partially enlarged view of "A" part of FIG. 5.

FIG. 1 is a perspective view illustrating a lens driving device according to a first exemplary embodiment of the present invention, FIG. 2 is an exploded perspective view illustrating a lens driving device according to a first exemplary embodiment of the present invention, FIG. 3 is perspective view illustrating a lens driving device according to a first exemplary embodiment of the present invention, FIG. 4 is a perspective view illustrating a base of a lens driving device according to a modification of a first exemplary embodiment of the present invention, FIG. 5 is a plane view illustrating a substrate portion of a lens driving device according to a first exemplary embodiment of the present invention, and FIG. 6 is a partially enlarged view of "A" part of FIG. 5.

The lens driving device (10) may include a cover member (100), a first mover (200), a second mover (300), a stator (400), a base (500), a support member (600) and a sensor portion (700) and an adhesive accommodating groove (800). However, the lens driving device (10) may omit any one or more of the cover member (100), the first mover (200), the second mover (300), the stator (400), the base (500), the support member (600), the sensor portion (700) and the adhesive accommodating groove (800). Inter alia, the sensor portion (700) may be omitted as an element for AF feedback function and/or OIS feedback function.

The cover member (100) may form an exterior look of lens driving device (10). The cover member (100) may take a bottom-opened cubic shape. However, the present invention is not limited thereto. The cover member (100) may include an upper plate (101) and a lateral plate (102) extended downwards from an external side of the upper plate (101). Meantime, a bottom end of the lateral plate (102) at the cover member (100) may be mounted to the base (500). An inner space formed by the cover member (100) and the base (500) may be disposed with a first mover (200), a second mover (300), a stator (400) and a support member (600).

Furthermore, the cover member (100) may be mounted to the base (500) by allowing an inner lateral surface to be adhered to a part or an entire lateral surface of the base (500), through which the cover member (100) may have functions of protecting inner elements from external shocks and inhibiting foreign objects from entering the cover member (100) as well.

The cover member (100) may be formed with a metal material. To be more specific, the cover member (100) may be formed with a metal plate. In this case, the cover member (100) may inhibit radio interference. That is, the cover member (100) may inhibit electric waves generated from outside of the lens driving device (10) from entering an inside of the cover member (100). Furthermore, the cover member (100) may inhibit the electric waves generated from inside of the cover member (100) from being emitted to outside of the cover member (100). However, the material of cover member (100) is not limited thereto.

The cover member (100) may include an opening (110) exposing the lens module by being formed at the upper plate (101). The opening (110) may be formed in a shape corresponding to that of the lens module. The size of opening (110) may be formed greater than that of a diameter of the lens module in order to allow the lens module to be assembled through the opening (110). Furthermore, a light introduced through the opening (110) may pass through the lens module. Meantime, the light having passed the lens module may be transmitted to the image sensor.

The first mover (200) may be coupled to a lens module, one of the constitutional elements of camera module {however, the lens module may be explained as one of the elements of the lens driving device (10)}. The lens module may be disposed at an inside of the first mover (200). An inner circumferential surface of the first mover (200) may be coupled by an outer circumferential surface of the lens module. Meantime, the first mover (200) may move integrally with the lens module through an interaction with the second mover (300). That is, the first mover (200) can move the lens module.

The first mover (200) may include a bobbin (210) and a first driving portion (220). The first mover (200) may include a bobbin (21) coupled to the lens module. The first mover (200) may include a first driving portion (220) disposed at the bobbin (210) to move by an electromagnetic interaction with a second driving portion (320).

The bobbin (210) may be coupled to the lens module. To be more specific, an inner circumferential surface of the bobbin (210) may be coupled by an outer circumferential surface of the lens module. Meanwhile, the bobbin (210) may be coupled by the first driving portion (220). Furthermore, a bottom surface of bobbin (210) may be coupled to a bottom support member (620) and an upper surface of the bobbin (210) may be coupled to an upper support member (610). The bobbin (210) may be disposed at an inside of a housing (310). The bobbin (210) may be moved to an optical axis direction relative to the housing (310).

The bobbin (210) may include a lens coupling portion (211) formed thereinside. The lens coupling portion (211) may be coupled by the lens module. An inner circumferential surface of the lens coupling portion (211) may be formed with a screw thread in a shape corresponding to that of a screw thread formed at an outer circumferential surface of the lens module. That is, the outer circumferential surface of lens module may be screw-connected to the inner circumferential surface of the lens coupling portion (211). Meantime, an adhesive may be infused into between the lens module and the bobbin (210). At this time, the adhesive may be an epoxy cured by UV (Ultraviolet) rays. In other words, the lens module and the bobbin (210) may be adhered by an UV curing epoxy. Furthermore, the lens module and the bobbin (210) may be adhered by a heat-curing epoxy.

The bobbin (210) may include a first driving portion coupling portion (212) wound by or installed with the first driving portion (220). The first driving portion coupling portion (212) may be integrally formed with an external lateral surface of the bobbin (210). Furthermore, the first driving portion coupling portion (212) may be continuously formed along with the external lateral surface of the bobbin (210) or may be spaced apart at a predetermined distance. The first driving portion coupling portion (212) may include a recess portion formed by a part of the external lateral surface of the bobbin (210) being recessed. The recess portion may be disposed with the first driving portion (220), and at this time, the first driving portion (220) may be supported by the first driving portion coupling portion (212).

For example, the first driving portion coupling portion (212) may be formed by allowing a portion protruded on an upper/lower sides of the recess portion to be positioned. At this time, a coil of the first driving portion (300) may be directly wound on the first driving coupling portion (212). Alternatively, as another example, the first driving portion coupling portion (212) may take an upper side-opened or a bottom side-opened shape of the recess portion, and may be formed by allowing a hitching portion to be formed at the other side. At this time, the coil of the first driving portion (300) may be inserted and coupled through an opened portion in a pre-wound state.

The bobbin (210) may include an upper coupling portion (213) coupled with an upper support member (610). The upper coupling portion (213) may be coupled to an inner lateral portion (612) of the upper support member (610). For example, a lug (not shown) of the upper coupling portion (213) may be coupled by being inserted into a groove or a hole (not shown) at the inner lateral portion (612). Meantime, these elements may be coupled by allowing a lug to be disposed at the upper support member (610) and by allowing a groove or a hole to be disposed at the bobbin (210). Meantime, the bobbin (210) may include a bottom coupling portion (not shown) coupled to a bottom support member (620). The bottom coupling portion formed at a bottom of the bobbin (210) may be coupled to an inner lateral portion (622) of the bottom support member (620). For example, a lug (not shown) at the bottom coupling portion may be coupled by being inserted into a groove or a hole (not shown) of the inner lateral portion (622). Meanwhile, these elements may be coupled by allowing a lug to be disposed at the bottom support member (620) and by allowing a groove or a hole to be disposed on the bobbin (210).

The first driving portion (220) may be disposed in opposition to a second driving portion (320) of the second mover (300). The first driving portion (220) may move the bobbin (210) relative to the housing (310) through an electromagnetic interaction with the second driving portion (320). The first driving portion (220) may include a coil. The coil may be guided to the first driving portion coupling portion (212) to be wound on an external lateral surface of the bobbin (210). Furthermore, in another exemplary embodiment, the coil may be arranged at the external lateral surface of the bobbin (210) by allowing four coils to be independently disposed to form a between adjacent two coils.

When the first driving portion (220) includes a coil, an electric power supplied to the coil may be supplied through the bottom support member (620). At this time, the bottom support member (620) may be divisively formed into a pair for power supply to the coil.

Meanwhile, the first driving portion (220) may include a pair of lead cables (not shown) in order to supply a power. In this case, each of the pair of lead cables on the first driving portion (220) may be electrically coupled to each of a pair of bottom support members (620). Alternatively, the first driving portion (220) may receive the power from the upper support member (610). Meantime, when electricity is supplied to the coil, an electromagnetic field may be generated about the coil. In another exemplary embodiment, the first driving portion (220) may include a magnet, and the second driving portion (320) may include a coil.

The second mover (300) may be disposed at an external side of the first mover (200) in opposition to the first mover (200). The second mover (300) may be supported by the bottom-side disposed base (500). The second mover (300) may be supported by a fixing member. At this time, the fixing member may include the base (500) and the stator (400). That is, the second mover (300) may be supported by the base (500) and/or by a circuit substrate (410). The second mover (300) may be disposed at an inner space of the cover member (100).

The second mover (300) may include a housing (310) and a second driving portion (320). The second mover (300) may include a housing (310) disposed at an outside of the bobbin (210). Furthermore, the second mover (300) may include a second driving portion (320) fixed to the housing (310) by being disposed in opposition to the first driving portion (220).

At least a part of the housing (310) may be formed in a shape corresponding to that of an inner lateral surface of the cover member (100). Particularly, an external surface of the housing (310) may be formed in a shape corresponding to that of an inner lateral surface of the lateral plate (102) at the cover member (100). The external lateral surface of the housing (310) and the inner lateral surface of the lateral plate (102) at the cover member (100) may be formed in a flat shape.

To be more specific, when the housing (310) is in an initial position, the external lateral surface of the housing (310) and the inner lateral surface of the lateral plate (102) at the cover member (100) may be parallel. In this case, when the housing (310) maximally moves toward the cover member (100), shocks generated from the housing (310) and/or the cover member (100) may be dispersed because the external lateral surface of the housing (310) and the inner lateral surface of the lateral plate (102) at the cover member (100) are surface-contacted. The housing (310) may take a cubic shape including four (4) lateral surfaces. However, the housing (310) may take any shape as long as the housing (310) can be arranged inside the cover member (100).

The housing (310) may be formed with an insulation material, and may be formed in an injection-molded article in consideration of productivity. The housing (310) is a part moving for OIS driving, and may be arranged by being spaced apart from the cover member (100) at a predetermined distance. However, the housing (310) may be fixed to the base (500) in an AF model. Alternatively, the housing (310) may be omitted in the AF model, and a magnet formed as the second driving portion (320) may be fixed to the cover member (100).

The housing (310) may be upper/bottom side-opened to include a first mover (200) in order to allow the first mover (200) to vertically move. The housing (310) may include, at an inner side thereof, an upper/bottom opened inner space (311). The inner space (311) may be movably disposed with the bobbin (210). That is, the inner space (311) may be formed in a shape corresponding to that of bobbin (210). Furthermore, an inner circumferential surface of the housing (310) forming the inner space (311) may be disposed by being spaced apart from an outer circumferential surface of the bobbin (210).

The housing (310) may include, at a lateral surface, a second driving portion coupling portion (312) that accommodates the second driving portion (320) by being formed in a shape corresponding to that of the second driving portion (320). That is, the second driving portion coupling portion (312) may fix the second driving portion (320) by accommodating the second driving portion (320). The second driving portion (320) may be fixed by an adhesive (not shown) to the second driving portion coupling portion (312). Meantime, the second driving portion coupling portion (312) may be disposed at an inner circumferential surface of the housing (310). In this case, there is an advantageous strength for an electromagnetic interaction with the first driving portion (220) disposed at an inside of the second driving portion (320).

Furthermore, the second driving portion coupling portion (312) may take a bottom-opened shape. In this case, there is an advantageous strength for an electromagnetic interaction between a third driving portion (420) disposed at a bottom side of the second driving portion (320) and the second driving portion (320). For example, a bottom end of the second driving portion (320) may be protrusively and more downwardly disposed than a bottom end of the housing (310). The second driving portion coupling portion (312) may be formed in four pieces. Each of the second driving portion coupling portions (312) may be coupled by each of the second driving portion (320).

The housing (310) may be coupled at an upper surface with an upper support member (610), and may be coupled at a bottom surface with a bottom support member (620). The housing (310) may include an upper side coupling portion (313) coupled to the upper support member (610). The upper side coupling portion (313) may be coupled to an external portion (611) of the upper support member (610). For example, a lug of the upper side coupling portion (313) may be coupled to a groove or a hole (not shown) at the external portion (611) by being inserted thereinto. Meantime, as a modification, the upper support member (610) may be formed with a lug, and the housing (310) may be formed with a groove or a hole, whereby both elements may be coupled thereby. Meantime, the housing (310) may include a bottom coupling portion (not shown) coupled to the bottom support member (620). The bottom coupling portion formed at a bottom surface of the housing (310) may be coupled to an external portion (621) of the bottom support member (620). For example, a lug of the bottom coupling portion may be coupled by being inserted into a groove or a hole of the external portion (621). Meantime, as a modification, a lug may be formed at the bottom support member (620) and a groove or a hole may be formed at the housing (310), whereby both elements can be coupled.

The housing (310) may include a first lateral surface, a second lateral surface formed adjacent to the first lateral surface and a corner portion interposed between the first and the second lateral surfaces. The corner portion of the housing (310) may be disposed with an upper stopper (not shown).

The upper stopper may be vertically overlapped with the cover member (100). When the housing (310) is moved upwards by an external shock, the upper stopper may restrict the upward movement of housing (310) by being contacted to the cover member (100).

The second driving portion magnet (320) may be disposed in opposition to the first driving portion (220) of the first mover (200). The second driving portion (320) may move the first driving portion (220) through an electromagnetic interaction with the first driving portion (220). The second driving portion (320) may include a magnet. The magnet may be fixed to the second driving portion coupling portion (312) of the housing (310). The second driving portion (320) may be disposed at the housing (310) in such a fashion that four (4) magnets are independently formed, and two adjacent magnets form a right angle of 90°, as illustrated in FIG. 2. That is, the second driving portion (320) can promote an efficient use of inner volume by being installed on four lateral surfaces of the housing (310), each at a predetermined interval. Furthermore, the second driving portion (320) may be attached to the housing (310) using an adhesive, but the present invention is not limited thereto. Meantime, the first driving portion (220) may include magnets, and the second driving portion (320) may include coils.

The stator (400) may be disposed in opposition to a bottom side of the second mover (300). The stator (400) can movably support the second mover (300). The stator (400) may move the second mover (300). Furthermore, the stator (400) may be disposed at a center with through holes (411, 412) corresponding to the lens module.

The stator (400) may include a substrate portion (410) and a third driving portion (420). The stator (400) may include a substrate portion (410) interposed between the third driving portion (420) and the base (500). Furthermore, the stator (400) may include a third driving portion (420) oppositely formed at a bottom side of the second driving portion (320).

The substrate portion (410) may include a flexible substrate of FPCB (Flexible Printed Circuit Board). The substrate portion (410) may be formed with an FPCB. The substrate portion (410) may be interposed between the third driving portion (420) and the base (500). Meantime, the substrate portion (410) can supply electricity to the third driving portion (420). Furthermore, the substrate portion (410) may supply electricity to the first driving portion (220) or the second driving portion (320). For example, the substrate portion (410) can supply electricity to the first driving portion (220) through the lateral support member (630), the upper support member (610), the conductive member (640) and the bottom support member (620). Alternatively, the substrate portion (410) can supply electricity to the first driving portion (220) through the lateral support member (630) and the upper support member (610).

The circuit substrate (410) may include a body portion (411), a terminal portion (412) and a through hole (413). The substrate portion (410) may include a body portion (411) disposed at an upper surface of the base (500). The body portion (411) may be accommodated on an upper surface of the base (500). That is, a bottom surface of the body portion (411) and an upper surface of the base (500) may be mutually contacted. The body portion (411) may be electrically connected to the third driving portion (420) to supply a power to the third driving portion (420). Furthermore, the body portion (411) may supply a power to the first driving portion (220) or to the second driving portion (320) through the lateral support member (630), the upper support member (610), the conductive member (640) and/or the bottom support member (620). The body portion (411) may receive the power from an outside through the terminal portion (412).

The circuit substrate (410) may include a terminal portion (412) downwardly extended from the body portion (411). The terminal portion (412) may be downwardly extended from the body portion (411). The terminal portion (412) may receive a power from outside to supply the power to the first to third driving portions (220 320, 420) and/or to the first and second sensor portions (710, 720) through the body portion (411). The terminal portion (412) may be integrally formed with the body portion (411). The terminal portion (412) may be formed by being bent from the integrally-formed body portion (411).

The terminal portion (412) may include a terminal surface (412*a*), a plurality of terminals (412*b*) arranged and/or formed on a surface of the terminal surface (412*a*) and a cover layer (412*c*) arranged and/or formed on surfaces of the terminal surface (412*a*) and the terminal (412*b*) to partially cover the terminal surface (412*a*) and the terminals (412*b*). A border line (L1) formed between the cover layer (412*c*) formed on the surface of the terminal (412*b*) and the terminal (412*b*) may be formed to be longer than a width (L2) of the terminal (412*b*).

The terminal portion (412) may be arranged and/or formed on a surface of the terminal surface (412*a*) in a plural number. That is, the surface of the terminal surface (412*a*) may be formed with a plurality of terminals (412*b*) each at a predetermined distance by a print technique or an etching technique. The substrate portion (410) may be formed by being stacked with a plurality of layers. Meantime, the terminal (412*b*) may be also formed by being stacked on the substrate portion (410). For example, although a pattern may be formed on the substrate portion (410) on which the terminal (412*b*) is stacked thereafter, the present invention is not limited thereto. The number of plurality of terminals (412*b*) may be appropriately selected in response to an electrical connecting structure with an outside configuration. Furthermore, when the two or more terminal portions (412) are formed, the number of terminals (412*b*) formed on each terminal surface (412*a*) need not be always matched.

The cover layer (412*c*) may be formed on surfaces of the terminal surface (412*a*) and the terminal (412*b*) to function to partially cover surfaces of the terminal surface (412*a*) and the terminal (412*b*). The cover layer (412*c*) may be formed on surfaces of the terminal surface (412*a*) and the terminal (412*b*) to function to electrically insulate the terminal surface (412*a*) and the terminal (412*b*), inhibit tear/wear of the terminal surface (412*a*) and the terminal (412*b*), or reinforce the strength of the terminal surface (412*a*) and the terminal (412*b*). At this time, the cover layer (412*c*) may be PSR (Photo Solder Resist) or a cover lay. The cover layer (412*c*) may be formed by a method of being coated on the surfaces of the terminal surface (412*a*) and the terminal (412*b*). However, the present invention is not limited thereto.

The cover layer (412*c*) may function to inhibit the lead from being attached to an unnecessary part during the soldering process, and to inhibit various elements and circuit patterns formed on a PCB (250) from being oxidized or degraded by oxygen and moisture by being directly exposed to the air. The cover layer (412*c*) may be so formed as to be partially exposed at a surface of the terminal (412*b*) while encompassing the terminal (412*b*). The terminal (412*b*) is to be electrically coupled with terminals on the PCB, and, in light of the fact that it is appropriate to obtain a soldering area for electrical coupling, the cover layer (412*c*) may be formed only on an upper surface of the terminal (412*c*) while leaving an exposed area on the terminal (412*b*).

At this time, the cover layer (412*c*) may be formed with a photo solder resist ink or polyimide material, for example. A liquefied ink of photo solder resist ink may be coated on the terminal surface (412*a*) and the terminal (412*b*) and cured to form the cover layer (412*c*). At this time, after the photo solder resist ink may be entirely coated on the terminal (412*b*), the unnecessary part of photo solder resist ink may be removed through exposure and development works to form an exposure portion of the terminal (412*b*). Furthermore, only the necessary part may be coated and cured to form an exposure area of the terminal (412*b*). Furthermore, film or tape may be cut to a necessary shape to be coated on the surfaces of the terminal surface (412*a*) and the terminal (412*b*) whereby the exposure area can be formed on the terminal (412*b*) to form the cover layer (412*c*).

Alternatively, both the photo solder resist ink and polyimide are all used, where works are first done using the photo solder resist ink according to application method and structure of product, and then works are done with the polyimide, or conversely, works on polyimide may be done first and then works on the photo solder resist ink can be made later.

Meantime, the polyimide is a soft material, and may be used for manufacturing an FPCB. Thus, in the exemplary embodiment, the substrate portion (410) and the cover layer (412*c*) may be formed with the same polyimide.

The terminal (412*b*) may include a stacked portion (412*ba*) covered by the cover layer (412*c*) and an exposure portion (412*bb*) not covered by the cover layer (412*c*). Referring to FIG. 6, an upper surface of terminal (412*b*), i.e., a part indicated in a hidden line is the stacked portion (412*ba*) covered by the cover layer (412*c*). Meantime, a bottom area of the terminal (412*b*), i.e., a part indicated in a solid line, is an exposure portion (412*bb*) not covered by the cover layer (412*c*) in order to be electrically connected to an outside element. A border line (L1) may be formed between the cover layer (412*c*) and the terminal (412*b*). In the first exemplary embodiment of the present invention, a length of the border line (L1) may be formed to be longer than a width (L2) of the terminal (412*b*). As discussed above, the cover layer (412*c*) is formed to cover a partial portion of the terminal (412*b*), whereby the terminal is inhibited from being peeled off from the substrate portion (410). The terminal (412*b*) may be inhibited from being detached from the substrate portion (410) by the stacked portion (412*ba*).

If the border line (L1) between the cover layer (412*c*) and the terminal (412*b*) is correspondingly formed with the width (L2) of the terminal (412*b*) as in a comparative border line (L3) of FIG. 6, cracks may be easily generated in the comparative border line (L3). That is, when a camera module assembled with a lens driving device receives a shock due to fall or the like, the comparative border line (L3) may be generated with a stress, and the stress can generate a crack at the comparative border line (L3).

In other words, an area formed with the cover layer (412*b*) {indicated in a hidden line of terminal (412*b*)} based on the comparative border line (L3) may be comparatively and securely coupled of fixed to the terminal surface (412*a*) by the cover layer (412*b*). However, the exposure area not formed with the cover layer (412*b*) {indicated in a solid line of terminal (412*b*)} may be comparatively less securely coupled or fixed to the area indicated in a hidden line. Furthermore, the exposure area can be connected to an outside element using a soldering and the like, such that a shock force received by the outside element may be directly transmitted to the exposure area. Thus, when the camera module receives an outside shock such as a fall, the exposure area of the terminal (412b) may receive a greater shock than that of the non-exposure area indicated in the hidden line, whereby the comparative border line (L3) may be concentrated with the stress due to a difference of shocks.

The stress generated from the comparative border line (L3) may generate a crack on the terminal (412b) along the comparative border line (L3), and when the stress is accumulated by the repetitive outside shocks, the crack grows to disconnect the terminal (412b) along the comparative border line (L3). When the disconnection on the terminal (412b) is generated by the cracks, this connection may result in the cause of operation malfunction in the camera module.

In the first exemplary embodiment of the present invention, in order to restrict the generation of cracks, a length of the border line (L1) between the cover layer (412c) formed on a surface of the terminal (412b) and the terminal (412b) may be formed to be longer than a widthwise length of the terminal (412b).

For example, as illustrated in FIG. 6, the border line (L1) may be formed in a linear style having an apex, that is, may be formed of two side shapes of an isosceles triangle. Furthermore, the border line (L1) may be also formed of a triangle, i.e., may be formed of a shape with two sides out of three sides in a triangle being connected. In this type of shape, the border line (L1) may be formed to be longer than the widthwise length of the terminal (412b), and as a result, the border line (L1) may be dispersed of the stress on the terminal (412b) generated by the shocks over the comparative border line (L3).

When the stress is dispersed by the said shape of the border line (L1), the exposure area of the terminal (412b) can restrict the concentration of stress at a particular point of the border line (L1), even if the exposure area of the terminal (412b) receives the shock to the lengthwise or widthwise direction, whereby generation of cracks can be restricted.

The substrate portion (410) may include a through hole (413) so formed as to allow the body portion (411) to pass therethrough. The substrate portion (410) may include a through hole (413) to pass a light having passed the lens module. The through hole (413) may be so formed as to allow the light having passed the lens module to reach the image sensor.

The third driving portion (420) can move the second driving portion (320) through the electromagnetic interaction. The third driving portion (420) may include a coil. When a power is applied to the coil of the third driving portion (420), the second driving portion (320) and the housing (310) fixed by the second driving portion (320) may be integrally moved through an interaction with the second driving portion (320). The third driving portion (420) may be mounted on the substrate portion (410) or may be electrically connected to the substrate portion (410). Meantime, the third driving portion (420) may be formed with a through hole (421) for a light of the lens module to pass by. Furthermore, the third driving portion (420) may be formed with an FP (Fine Patterned) coil in consideration of miniaturization of the lens driving device (10, to reduce a height to a z axis direction which is an optical axis direction) to be disposed or mounted at the substrate portion (410). The FP coil may be so formed as to minimize the interference with a second sensor portion (720) disposed at a bottom side. The FP coil may be so formed as not to overlap with the second sensor portion (720) to the vertical direction. In this case, each opposing FP coil may be asymmetrically formed.

The base (500) may support the stator (400) from under. The base (500) may movably support the second mover (300). At this time, the base (500) may support the substrate portion (410) and the substrate portion (410) may support the second mover (300). That is, the base (500) may directly or indirectly support the second mover (300). The base (500) may be formed, at a bottom side, with a PCB. The base (500) may include a through hole (510), a foreign object collection portion (520), a sensor mounting portion (530) and a terminal portion accommodating portion (540).

The base (500) may include a through hole (510) formed at a position corresponding to that of a lens coupling portion (211) of the bobbin (210). The base (500) may perform a function of sensor holder protecting the image sensor. Meantime, the through hole (510) of the base (500) may be coupled by an infrared ray filter. Alternatively, an infrared ray filter may be coupled to a separate sensor holder arranged at a bottom surface of the base (500).

The base (500) may include a foreign object collection portion (520) collecting foreign objects introduced into the cover member (100). The foreign object collection portion (520) may be disposed at an upper surface of the base (500) to collect not only an adhesive material but also foreign objects inside of an inner space formed by cover member (100) and the base (500). The base (500) may include a sensor mounting portion (530) coupled by a second sensor portion (720). That is, the second sensor portion (720) may be mounted on the sensor mounting portion (530). At this time, the second sensor portion (720) may detect the second driving portion (320) coupled to the housing (310) to detect a horizontal movement or tilt of the housing (310). The sensor mounting portion (530) may be disposed in two pieces. Each of two the sensor mounting portions (530) may be disposed with the second sensor portion (720). In this case, the second sensor portion (720) may be so disposed as to detect both the x axis and y axis direction movements of the housing (310).

The base (500) may include a terminal portion accommodating portion (540) accommodating the terminal portion (412) of the substrate portion (410). The terminal portion accommodating portion (540) may accommodate the terminal portion (412) of the substrate portion (410). The terminal portion accommodating portion (540) may be formed at a lateral side of the base (500) to accommodate at least a part of the terminal portion (412). The terminal portion accommodating portion (540) may include a terminal portion accommodating groove (541) accommodated by the terminal portion (412), and a terminal portion support portion (542) disposed across the terminal portion accommodating groove (541) to protrude to an outside and to support both lateral surfaces of the terminal portion (412).

The terminal portion accommodating groove (541) may be accommodated with the terminal portion (412). The terminal portion accommodating groove (541) may be formed at a lateral surface of the base (500). The terminal portion accommodating groove (541) may be formed to take a shape of being recessed inwardly at a part of the lateral surface of the base (500). That is, the terminal portion accommodating groove (541) may be formed by a lateral surface of the base (500).

The terminal portion support portion (542) may be disposed at both lateral surfaces of the terminal portion accommodating groove (541) and may be protruded to an outside to support both lateral surfaces of the terminal portion (412). The terminal portion support portion (542) may be formed in a lug shape to support at least a part of the both lateral surfaces of the terminal portion (412). That is, the terminal portion support portion (542) can inhibit the terminal portion (412) accommodated in the terminal portion accommodating groove (541) from being disengaged to a lateral side. The terminal portion support portion (542) may include a first support portion (542*a*) supporting one lateral surface of the terminal portion (412) and a second support portion (542*b*) supporting the other lateral surface of the terminal portion (412). That is, the first support portion (542*a*) may support one lateral surface of the terminal portion (412) and the second support portion (542*b*) may support the other lateral surface of the terminal portion (421)

The support member (600) may connect two or more of the first mover (200), the second mover (300) and the base (500). The support member (600) may elastically connect more than two elements of the first mover (200), the second mover (300) and the base (500) to allow a relative movement among each element. The support member (600) may be formed with an elastic member. The support member (600) may include an upper support member (610), a bottom support member (620), lateral support member (630) and a conductive member (640). However, the conductive member (640) is disposed for electrical conduction of the upper support member (610) and the bottom support member (620), such that the conductive member (640) may be separately explained from the upper support member (610), the bottom support member (620) and the lateral support member (630).

The upper support member (610) may include an external portion (611), an internal portion (612) and a connection portion (613). The upper support member (610) may include an external portion (611) coupled with the housing (310), an internal portion (612) coupled with the bobbin (210), and a connection portion (613) elastically connecting the external portion (611) and the internal portion (612).

The upper support member (610) may be connected to an upper surface of the first mover (200) and to an upper surface of the second mover (300). To be more specific, the upper support member (610) may be coupled to an upper surface of bobbin (210) and to an upper surface of housing (310). The internal portion (612) of the upper support member (610) may be coupled to an upper coupling portion (213) of the bobbin (210), and the external portion (611) of the upper support member (610) may be coupled to an upper coupling portion (313) of the housing (310).

The upper support member (610) may be divided to six (6) pieces. At this time, two pieces out of the six upper support members (610) may be conductively connected to the bottom support member (620) for use to apply electricity to the first driving portion (220). Each of the two upper support members (610) may be electrically connected to a pair of bottom support members (620*a*, 620*b*) through the conductive member (640). Meantime, remaining four upper support members out of the six upper support members (610) may supply the electricity to the first sensor portion (710) and may be used for transmission/receipt of information and signals between a controller and the first sensor portion (710). Furthermore, as a modification, two upper support members in the six upper support members (610) may be directly connected to the first driving portion (220), and remaining four may be connected to the first sensor portion (710).

The bottom support member (620) may include a pair of bottom support members (620*a*, 620*b*). That is, bottom support member (620) may include a first bottom support member (620*a*) and a second bottom support member (620*b*). Each of the first bottom support member (620*a*) and the second bottom support member (620*b*) may receive electricity by being connected to a pair of lead cables at the first driving portion (220) formed with a coil. Meantime, the pair of bottom support members (620*a*, 620*b*) may be electrically connected to the substrate portion (410). Through this configuration, the pair of bottom support members (620) can supply the electricity supplied from the substrate portion (410) to the first driving portion (220).

The bottom support member (620) may include an external portion (621), an internal portion (622) and a connection portion (623). The bottom support member (620) may include an external portion (621) coupled to the housing (310), an internal portion (622) coupled to the bobbin (210) and a connection portion (623) elastically connecting the external portion (621) and the internal portion (622).

The bottom support member (620) may be connected to a bottom surface of the first mover (200) and to a bottom surface of the second mover (300). To be more specific, the bottom support member (620) may be connected to a bottom surface of the bobbin (210) and to a bottom surface of the housing (310). The internal portion (622) of the bottom support member (620) may be coupled by a bottom coupling portion of the bobbin (210) and the external portion (621) of the bottom support member (620) may be coupled by a bottom coupling portion of the housing (310).

The lateral support member (630) may be fixed at one end to the stator (400) and/or the base (500), and coupled at the other end to the upper support member (610) and/or to the second mover (300). The lateral support member (630) may be coupled at one side to the stator (400) and coupled at the other side to the upper support member (610). In another exemplary embodiment, the lateral support member (630) may be coupled at one side to the base (500), and coupled at the other side to the second mover (300), whereby the lateral support member (630) can elastically support the second mover (300) to allow the second mover (300) to horizontally move or to tilt.

The lateral support member (630) may include a plurality of wires. Furthermore, the lateral support member (630) may include a plurality of leaf springs. The lateral support member (630) may be formed in the same number as that of the upper support member (610). That is, the lateral support member (630) may be formed in 6 pieces to be respectively connected to a 6-piece upper support member (610). In this case, the lateral support member (630) can supply an electricity supplied from the stator (400) or supplied from outside to each of the 6-piece upper support members (610). The lateral support member (630) may be determined in the number of pieces in consideration of symmetry. The lateral support member (630) may be formed in a total number of eight (8), 2 pieces each to four or more corners of housing (310).

The lateral support member (630) or the upper support member (610) may include a shock absorption portion (not shown). The shock absorption portion may be formed on at least any one or more of the lateral support member (630) and the upper support member (610). The shock absorption portion may be a separate member like a damper. Furthermore, the shock absorption portion may be realized through changes in shape on any one or more parts of the lateral support member (630) and the upper support member (610).

The conductive member (640) may electrically connect the upper support member (610) and the bottom support member (620). The conductive member (640) may be formed separately from the lateral support member (630). Electricity supplied to the upper support member (610) through the conductive member (640) may be supplied to the bottom support member (620), and may be supplied to the first driving portion (220) through the bottom support member (620). Meantime, as a modification, when the upper support member (610) is directly connected to the first driving portion (220), the conductive member (640) may be omitted.

The sensor portion (700) may be used for any one or more of AF feedback and OIS feedback. The sensor portion (700) may detect positions or movements of any one or more of the first mover (200) and the second mover (300). The sensor portion (700) may include a first sensor portion (710) and a second sensor portion (720). The first sensor portion (710) may provide information for AF feedback by sensing a relative vertical movement of the bobbin (210) relative to the housing (310). The second sensor portion (720) may provide information for OIS feedback by detecting a horizontal direction movement and tilt of the second mover (300).

The first sensor portion (710) may be disposed at the first mover (200). The first sensor portion (710) may be disposed at the bobbin (210). The first sensor portion (710) may be fixed by being inserted into a sensor guide groove (not shown) formed at an outer circumferential surface of bobbin (210). The first sensor portion (710) may include a first sensor (711), a flexible PCB (712) and a terminal portion (713).

The first sensor (711) may detect a movement or position of the bobbin (210). Alternatively, the first sensor (711) may detect a position of the first driving portion (320) mounted on the housing (310). The first sensor (711) may be a Hall sensor. The first sensor (711) may detect a relative position change between the bobbin (210) and the housing (310) by detecting a magnetic force generated from the second driving portion (320).

The flexible PCB (712) may be mounted with the first sensor (711). The flexible PCB (712) may be formed in a shape of a strip. At least one portion of the flexible PCB (712) may be inserted into a sensor guide groove by being formed in a shape corresponding to that of the sensor guide groove formed to be recessed at an upper surface of the bobbin (210). The flexible PCB (712) may be an FPCB. That is, the flexible PCB (712) may be bent in order to correspond to a shape of the sensor guide groove by being formed in a flexible manner. The flexible PCB (712) may be formed with a terminal portion (713).

The terminal portion (713) may supply electricity to the first sensor (711) through the flexible PCB (712) by receiving the electricity. Furthermore, the terminal portion (713) may receive a control command relative to the first sensor (711) or transmit a value sensed from the first sensor (711). The terminal portion (713) may be formed in the number of four (4) to be electrically connected to the upper support member (610). In this case, two terminal portions (713) may be used to receive electricity from the upper support member (610) and the remaining two terminal portions (713) may be used to transmit/receive information or a signal.

The second sensor portion (720) may be disposed at the stator (400). The second sensor portion (720) may be disposed at an upper surface or a bottom surface of substrate portion (410). The second sensor portion (720) may be disposed at a sensor mounting portion (530) formed at the base (500) by being disposed at a bottom surface of the substrate portion (410). The second sensor portion (720) may include a Hall sensor. In this case, the second sensor portion (720) may sense a magnetic field of the second driving portion (320) to sense a relative movement of the second mover (300) relative to the stator (400). The second sensor portion (720) may be formed in the number of more than two (2) to detect both the x axis and y axis movements of the second mover (300). The second sensor portion (720) may be so disposed as not to be overlapped to a vertical direction with the FP coil of the third driving portion (420).

An adhesive accommodating groove (800) may be formed at the terminal portion accommodating portion (540) to accommodate at least a part of an adhesive adhering the terminal portion (412) and the terminal portion accommodating portion (540). That is, the adhesive accommodating groove (800) may function as an adhesive tank accommodating the adhesive. The adhesive accommodating groove (800) may be formed to improve an adhesive force with the adhesive. The adhesive accommodating groove (800) may be concavely and inwardly formed at a lateral surface of the base (500) forming the terminal portion accommodating groove (541).

As illustrated in FIG. 3, the adhesive accommodating groove (800) may include a plurality of first accommodating grooves (810) formed by being extended to a vertical direction. The first accommodating groove (810) may be of a bottom-opened shape, and may be broadened at least on a part in width toward a bottom side. A first width (W1), which is an upper width of the first accommodating groove (810), may be narrower than a second width (W2), which is a bottom width of the first accommodating groove (810). In this case, the first accommodating groove (810) functioning as an adhesive tank may accommodate more adhesive toward a bottom side. Thus, a phenomenon of the adhesive being emitted to a bottom side along the first accommodating groove (810) can be minimized.

The first accommodating groove (810) may be disposed between a plurality of first lugs (820) more protrusively formed than the first accommodating groove (810). That is, the first accommodating groove (810) and the first lugs may be formed in a plural number, and may be alternately formed. Meantime, both lateral surfaces of the first lug (820) may be formed in a round manner. Furthermore, both lateral surfaces of the first lug (820) may be sloped.

In a modification as illustrated in FIG. 4, the adhesive accommodating groove (800) may include a second accommodating groove (830) horizontally extended from a first support portion (542*a*) to a second support portion (542*b*). The second accommodating groove (830) may be disposed at a bottom surface of a lateral surface of the base (500) forming the terminal portion accommodating groove (541), and may be of a bottom-opened shape. That is, a width of the second accommodating groove (830) may correspond to that of the terminal portion accommodating groove (541).

The second accommodating groove (830) may be formed by a second lug (840) disposed at an upper surface of a lateral surface at the base (500) and more protrusive to an outside than the second accommodating groove (830). At this time, each of the second lug (840) and the second accommodating groove (830) may have a corresponding length to a vertical direction.

Meantime, also in the modification, as in the first exemplary embodiment, a phenomenon of the adhesive moving to a bottom direction may be inhibited from being emitted to an outside by being accommodated into the second accommodating groove (830). Furthermore, although it is explained in the modification that the second accommodating groove (830) is formed at a bottom side of the lateral surface at the base (500), the second accommodating groove (830) may be formed at an upper side of lateral surface of the base (500), and the second lug (840) may be formed at a bottom side of the second accommodating groove (830). Even in this case, the second accommodating groove (830) may function as a bond tank.

Furthermore, the adhesive accommodating groove (800) may be formed in a combined shape of the first accommodating groove (810) according to the previous first exemplary embodiment and the second accommodating groove (830) according to the modification. Meantime, the adhesive accommodating groove (800) may include a lateral tank (not shown) disposed at a lateral side of the terminal portion accommodating groove (541) in order to inhibit a phenomenon of the adhesive being emitted to a lateral side.

In the first exemplary embodiment of the present invention, the phenomenon of the adhesive and the base (500) being separated under a high temperature and high moisture environment can be inhibited, because the adhesive accommodating groove (800) can perform a function of adhesive tank to increase an adhesive force (power) between the adhesive and the base (500). That is, the adhesive force between the terminal portion (412) of the substrate portion (410) and the base (500) can be improved to inhibit the separation phenomenon during the adhesion process and after the adhesion.

Hereinafter, operation of camera module according to a first exemplary embodiment of the present invention will be described.

First, an AF (Auto Focus) function of the camera module according to the first exemplary embodiment of the present invention will be explained.

When a power is supplied to the coil of the first driving portion (220), the first driving portion (220) may perform a movement relative to the second driving portion (320) by electromagnetic interaction between magnets of the first driving portion (220) and the second driving portion (320). At this time, the bobbin (210) coupled with the first driving portion (220) may integrally move along with the first driving portion (220). That is, the bobbin (210) coupled to an inner side of the lens module may vertically move relative to the housing (310). The movement by the bobbin (210) may result in the lens module closing in onto or distancing from the image sensor, whereby focus adjustment to a subject can be performed by the electricity being supplied to the coil of the first driving portion (220) according to the first exemplary embodiment of the present invention.

Meantime, an AF feedback may be applied in order to perform a more accurate realization of AF function for the camera module according to the first exemplary embodiment of the present invention.

The first sensor (711) mounted on the bobbin (210) and formed with a Hall sensor can detect a magnetic field of the magnet on the second driving portion (320) fixed to the housing (310). Meantime, when the bobbin (210) performs a relative movement to the housing (310), the amount of magnetic field detected by the first sensor (711) is changed. Using the abovementioned method, the first sensor (711) can transmit a detection value to a controller by detecting the movement of z axis direction or a position of the bobbin (210). The controller may determine whether to perform an additional movement to the bobbin (210) through the received detection value. This process is being performed in real time, such that the AF function of the camera module according to the first exemplary embodiment of the present invention can be more accurately implemented through the AF feedback.

Now, the OIS function of camera module according to the first exemplary embodiment of the present invention will be described.

When a power is supplied to a coil of third driving portion (420), the second driving portion (320) may perform a movement relative to the third driving portion (420) through an electromagnetic interaction of magnets between the third driving portion (420) and the second driving portion (320). At this time, the housing (310) coupled by the second driving portion (320) may move integrally with the second driving portion (320). That is, the housing (310) may horizontally move to the base (500). Meantime, at this time, the housing (310) may be induced to tilt relative to the base (500). This movement of housing (310) may result in the lens module moving to a direction parallel to that of the image sensor being positioned relative to the image sensor, whereby the OIS function can be performed by the power being supplied to the coil of the third driving portion (420).

Meantime, an OIS feedback may be applied for more accurate implementation of OIS function of camera module according to the first exemplary embodiment of the present invention.

A pair of second sensor portions (720) mounted on the base (500) and formed with a Hall sensor may detect a magnetic field of a magnet at the second driving portion (320) fixed to the housing (310). Meanwhile, when the housing (310) performs a relative movement to the base (500), the amount of magnetic field detected by the second sensor portion (720) is changed. Using the abovementioned method, the pair of second sensor portions (720) may transmit a detection value to a controller by detecting the movement of horizontal direction (x axis and y axis directions) or a position of the housing (310). The controller may determine whether to perform an additional movement to the housing (310) through the received detection value. This process is being performed in real time, such that the OIS function of the camera module according to a first exemplary embodiment of the present invention can be more accurately implemented through the OIS feedback.

Hereinafter, configuration of optical instrument according to a second exemplary embodiment of the present invention will be described.

The optical instrument according to the second exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical instrument according to the second exemplary embodiment of the present invention may include a main body (not shown), a display portion (not shown) arranged at one surface of the main body to display information, and a camera having a camera module (not shown) disposed at the main body to photograph an image or a photograph.

Hereinafter, configuration of camera module will be described.

The camera module may include a lens driving device, a lens module (not shown), an infrared cut-off filter (not shown), a PCB (not shown), an image sensor (not shown) and a controller (not shown).

The lens module may include one or more lenses and a lens barrel accommodating one or more lenses. However, one element of the lens module is not limited by the lens barrel, and any holder structure capable of supporting one or more lenses will suffice. The lens module may be coupled to the lens driving device to move along with the lens driving device. The lens module may be screw-coupled with the lens driving device. The lens module may be coupled to an inside of the lens driving device. Meantime, a light having passed the lens module may be irradiated on an image sensor.

The infrared cut-off filter may serve to inhibit a light of infrared ray region from entering the image sensor. The infrared cut-off filter may be interposed between the lens module and the image sensor. The infrared cut-off filter may be disposed at a base (1400, described later) and may be coupled to the holder member (not shown). The infrared cut-off filter may be mounted on a hollow hole formed at a center of the base (1400). The infrared cut-off filter may be formed with a film material or a glass material. Meantime, the infrared cut-off filter may be formed by allowing an infrared cut-off coating material to be coated on a plate-shaped optical filter such as an imaging plane protection cover glass or a cover glass.

The PCB may support the lens driving device. The PCB may be mounted with an image sensor. To be more specific, an upper surface of PCB may be disposed with a lens driving device, and an upper surface at an inner side of the PCB may be disposed with an image sensor. Furthermore, a sensor holder (not shown) may be disposed at an outside of an upper surface of the PCB, and the lens driving device may be coupled on to the sensor holder. Through this configuration, a light having passed the lens module accommodated at an inside of the lens driving device can be irradiated to the image sensor mounted on the PCB. The PCB can supply electricity to the lens driving device. Meantime, the PCB may be disposed with a controller for controlling the lens driving device.

The image sensor may be mounted on a PCB. The image sensor may be matched with the lens module in terms of optical axis, whereby the image sensor can obtain a light having passed the lens module. The image sensor may output the irradiated light as an image. The image sensor may be a CCD (charge coupled device), an MOS (metal oxide semi-conductor), a CPD and a CID. However, the types of image sensor may not be limited thereto.

The controller may be mounted on the PCB. Alternatively, the controller may be also disposed at an inside of lens driving device. The controller may control a direction, intensity and amplitude of a current supplied to each element of lens driving device. The controller may perform any one or more of an AF function and an OIS function of the camera module by controlling the lens driving device. That is, the controller may move the lens module to an optical axis direction or tile the lens module to a direction orthogonal to the optical axis direction by controlling the lens driving device. Furthermore, the controller may perform a feedback control of AF function and OIS function.

Hereinafter, the lens driving device according to a second exemplary embodiment of the present invention will be described in detail with reference to the accompanying drawings.

Figure 7:
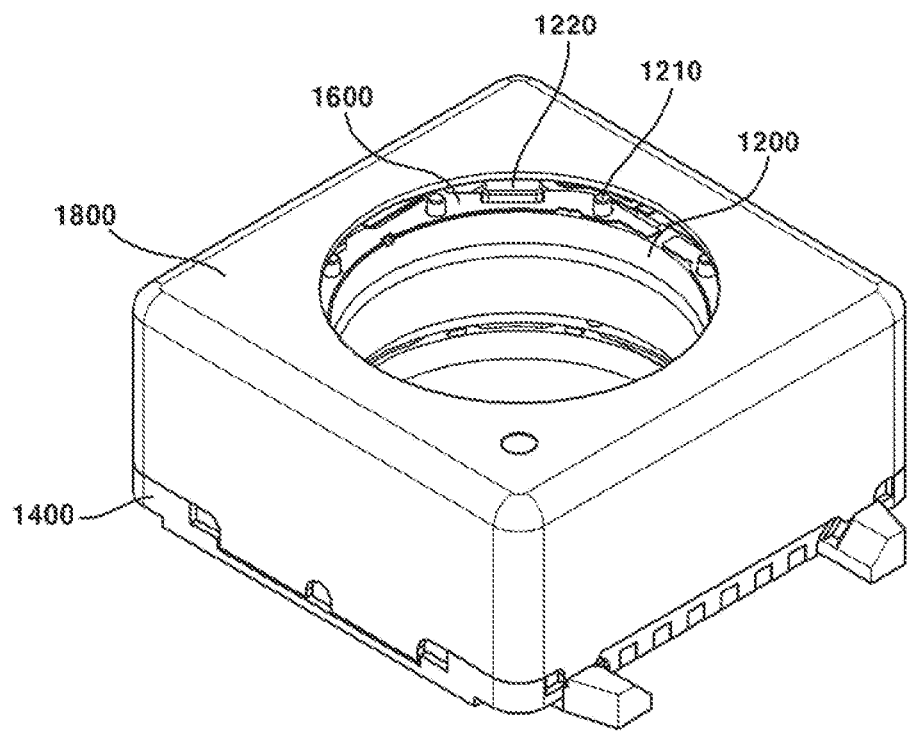
FIG. 7 is a perspective view illustrating a lens driving device according to a second exemplary embodiment of the present invention.
Figure 8:
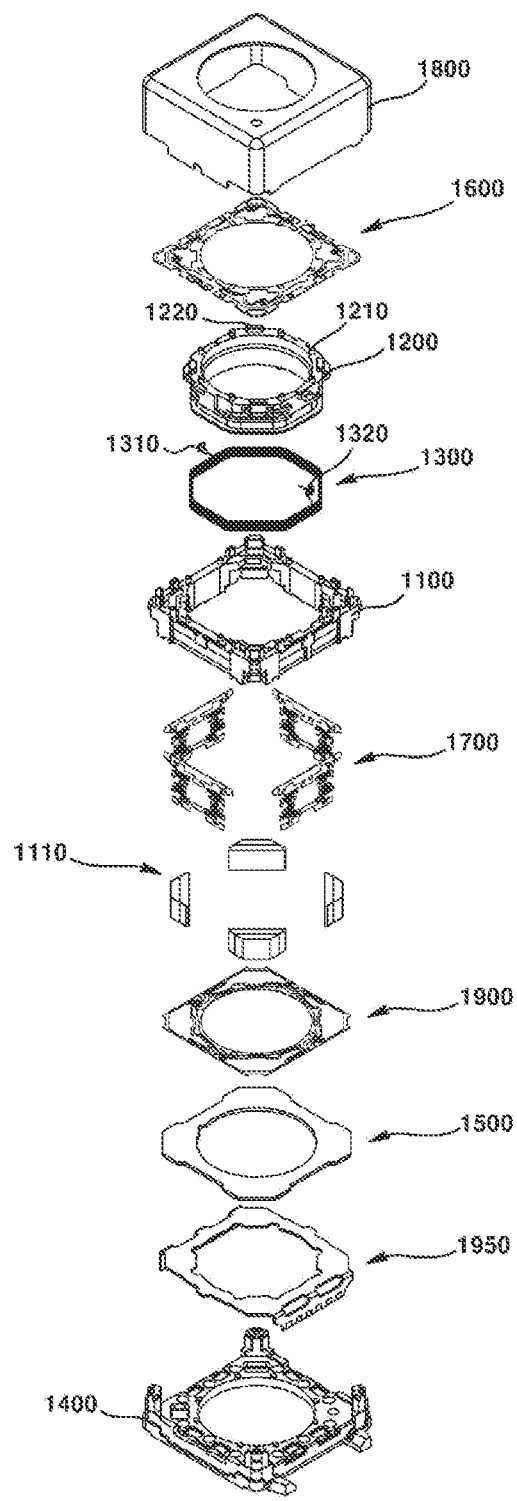
FIG. 8 is an exploded perspective view illustrating a lens driving device according to a second exemplary embodiment of the present invention.
Figure 9:
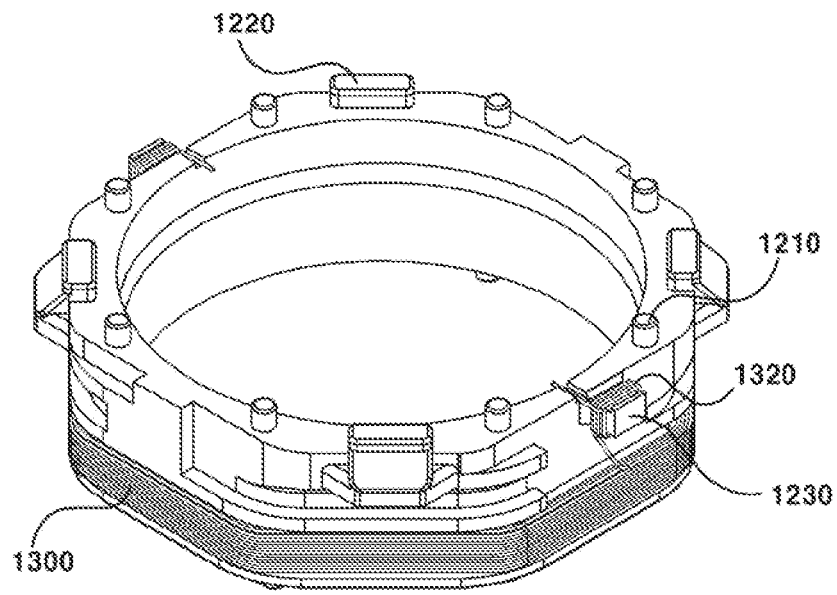
FIG. 9 is a perspective view illustrating a state in which a coil is coupled to a bobbin in a lens driving device according to a second exemplary embodiment of the present invention.
Figure 10:
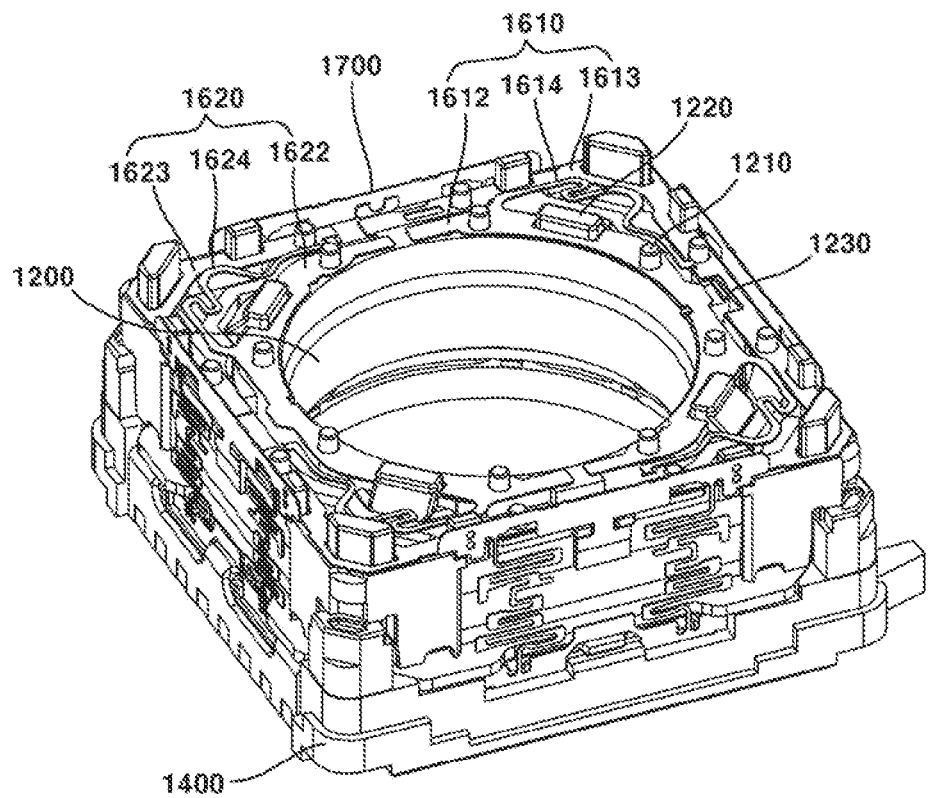
FIG. 10 is a schematic view illustrating a state in which a support member is arranged at a lens driving device according to a second exemplary embodiment of the present invention.

FIG. 7 is a perspective view illustrating a lens driving device according to a second exemplary embodiment of the present invention, FIG. 8 is an exploded perspective view illustrating a lens driving device according to a second exemplary embodiment of the present invention, FIG. 9 is a perspective view illustrating a state in which a coil is coupled to a bobbin in a lens driving device according to a second exemplary embodiment of the present invention, and FIG. 10 is a schematic view illustrating a state in which a support member is arranged at a lens driving device according to a second exemplary embodiment of the present invention.

The lens driving device may include a housing (1100), a bobbin (1200), a first coil (1300), a base (1400), a second coil (1500), an elastic member (1600, 1900), a support member (1700), a cover can (1800), and an FPCB (1950).

The bobbin (1200) may take an upper-bottom opened cylindrical shape with a cylinder-shaped hollow hole. The hollow hole formed at the bobbin (1200) may be accommodated with a lens module (not shown) formed with one or two lenses to allow a light to pass therethrough, where the lens module may vertically lift up and down along an optical axis relative to the bobbin (1200). Furthermore, the bobbin (1200) may be arranged inside the housing (1100, described later) and may lift up and down along an optical axis inside the housing (1100). The bobbin (1200) may include a winding portion (1230) protruded to an upper outside end. The winding portion (1230) may be wound with a first end portion (1310) and a second end portion (1320), that is, lead cables of the first coil (1300, described later), to inhibit the first coil (1300) and the lead cables (1310, 1320) inside the camera module from being interfered with other elements (see FIG. 9). Although FIG. 9 has illustrated that the winding portion (1230) is formed at one side of the bobbin (1200), the winding portion (1230) may be formed at any outer surface of the bobbin (1200) depending on the manufacturer's intention, and the number of winding portion (1230) is not limited. Furthermore, the bobbin (1200) may be further included with a stopper (1220) to inhibit a vertical movement inside the housing (1100, described later).

The bobbin (1200) may be formed at an upper side with at least one or more bosses (1210). The boss (1210) may be inserted into a hole (1612*a*, 1612*b*, 1612*c* and 1612*d*) of first and second elastic members (1610, 1620, described later) or into a hole, and may be coupled with the elastic member (1600) to fix the elastic member (1600) to the bobbin (1200).

The first driving portion may be disposed at the bobbin (1200). The first driving portion according to the second exemplary embodiment of the present invention may be a first coil (1300) wound on an outer circumferential surface of the bobbin (1200). To be more specific, the first coil (1300) may be an AF (Auto Focusing) coil. The first coil (1300) may be formed with a pair of lead cables, that is, a first end portion (1310) and a second end portion (1320), and the lead cables (1310, 1320) may be electrically connected to the elastic member (1600, described later).

The housing (1100) may movably accommodate the bobbin (1200) thereinside. In other words, the bobbin (1200) may lift up and down along an optical axis by being accommodated to an inside of the housing (1100). The housing (1100) may wrap the bobbin (1200) from outside of the bobbin (1200). The housing (1100) may be formed with a hollow hole and opened at an upper side and a bottom side.

The housing (1100) may be provided with a second driving portion at an inside or an outside thereof. The second driving portion may face the first driving portion, and may lift up and down the bobbin (1200) through mutual electromagnetic interaction between the first and second driving portions.

The second driving portion may be a magnet, and the second driving portion may be provided in a plural number, and the second driving portion or a magnet (1110) may be supported by the housing (1100) and a distance between adjacent magnets may be formed with an equidistant gap. When a current flows in the first driving portion, that is, when a current flows in the magnet (1110), a magnetic field may be formed on the first coil (1300) to vertically lift up and down the bobbin (1200) through an electromagnetic interaction with the first coil (1300). If the first driving portion is formed with the magnet (1110) according to the manufacturer's intention, the second driving portion may be formed with the first coil (1300).

The elastic member (1600) may elastically support the bobbin (1200) from the housing (1100). The elastic member (1600) may be formed with a coupling portion arranged at an upper side of the housing (1100) in a shape of a leaf spring and coupled to the bobbin (1200). The elastic member (1600) may be formed with a hole (not shown) through which a light pass through the lens module. A bottom surface about the hole of the elastic member may abut an upper side of the bobbin (1200) to elastically support the bobbin (1200) relative to the housing (1100).

The elastic member (1600) may be coupled to the first driving portion or the second driving portion, that is, the elastic member (1600) may be coupled to the first coil (1300) and the magnet (1110) and may be electrically connected. The elastic member (1600) may be electrically connected to the first driving portion or to the second driving portion at an area other than a distal end. That is, the elastic member (1600) may include a first elastic member (1610) and a second elastic member (1620), and each of the first elastic member (1610) and the second elastic member (1620) may be connected to lead cables, i.e., the first end portion (1310) and the second end portion (1320). An area where the first elastic member (1610) and the first end portion (1310) are coupled and an area where the second elastic member (1620) and the second end portion (1320) are coupled, may be disposed by being spaced apart from each distal end of the first and second elastic members (1610, 1620).

Figure 11:
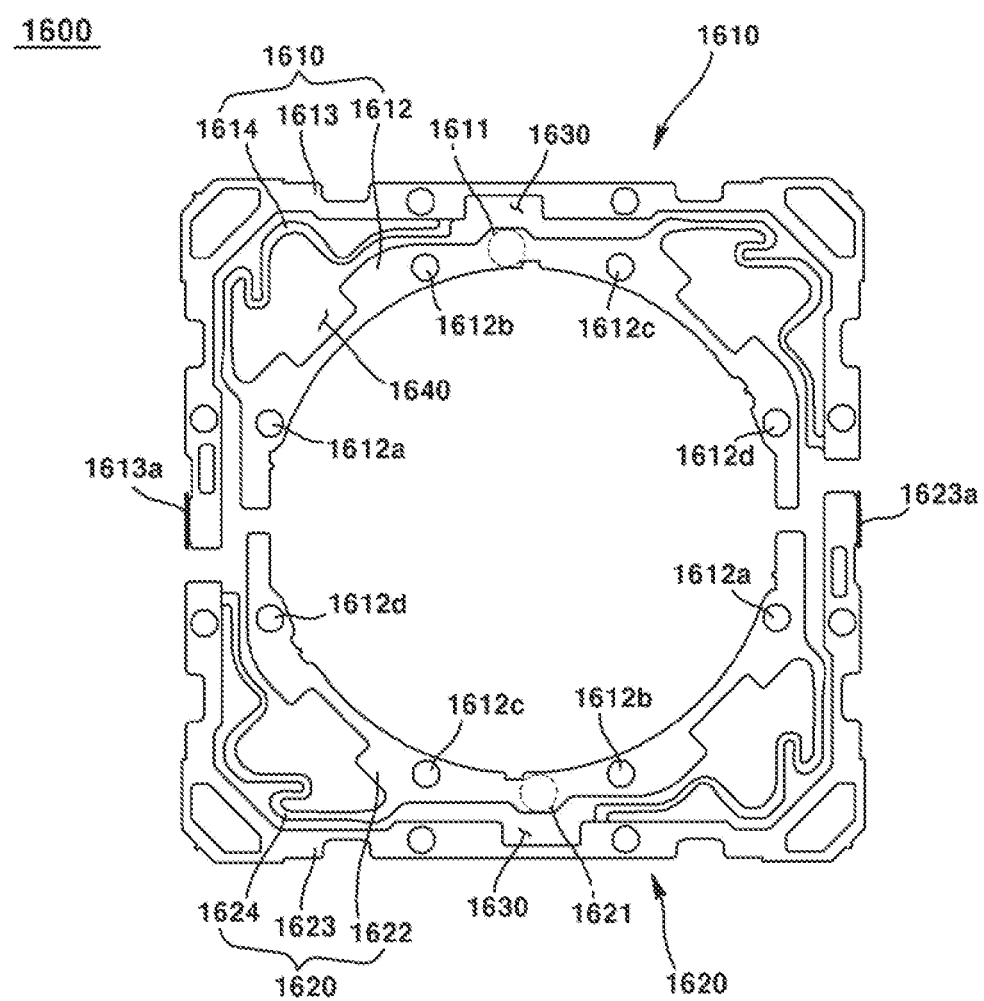
FIG. 11 is a schematic view illustrating a support member of a lens driving device according to a second exemplary embodiment of the present invention.

FIG. 11 is a schematic view illustrating a support member of a lens driving device according to a second exemplary embodiment of the present invention.

Referring to FIG. 11, the elastic member (1600) may include a first elastic member (1610), a second elastic member (1620) disposed in opposition to the first elastic member (1610).

The first elastic member (1610) may include a first internal portion (1612), a first external portion (1613) and a first elastic portion (1614). The first external portion (1613) may be disposed at an outside of the first internal portion (1612), and the first internal portion (1612) and the first external portion (1613) may be mutually connected by the first elastic portion (1614).

The second elastic member (1620) may include a second internal portion (1622), a second external portion (1623) and a second elastic portion (1624). The second external portion (1623) may be disposed at an outside of the second internal portion (1622), and the second internal portion (1622) and the second external portion (1623) may be mutually connected by the second elastic portion (1624). Furthermore, the second elastic member (1620) may be disposed opposite to the first elastic member (1610). That is, the second internal portion (1622) may face the first internal portion (1612), and the second external portion (1623) may face the first external portion (1613).

The first internal portion (1612) may be formed with a coupling portion in order to be coupled to the bobbin (1200), where the coupling portion may take a shape of a hole. That is, the first internal portion (1612) may be formed with at least one or more holes (1612a, 1612b, 1612c, 1612d) or grooves to correspond to a position of a boss (1210) so as to allow the boss (1210) of the bobbin (1200) to be inserted thereinto. The holes (1612a, 1612b, 1612c, 1612d) or grooves may include first to fourth holes (1612a, 612b, 612c, 612d), and the first to fourth holes (1612a, 612b, 612c, 612d) may be formed at an equidistant gap from each distal end of the first and second internal portions (1612, 1622). Each hole (1612a, 1612b, 1612c, 1612d) or grooves at the first internal portion (1612) may correspondingly face or may be correspondingly formed to each hole (1622a, 1622b, 1622c, 1622d) or grooves at the second internal portion (1622).

The second internal portion (1622) may be formed with a coupling portion in order to be coupled to the bobbin (1200), as in the first internal portion (1612), where the coupling portion may take a shape of a hole. That is, the second internal portion (1622) may be formed with at least one or more holes (1622a, 1622b, 1622c, 1622d) or grooves to correspond to a position of a boss (1210) so as to allow the boss (1210) of the bobbin (1200) to be inserted thereinto. The holes (1622a, 1622b, 1622c, 1622d) or grooves may include first to fourth holes (1622a, 1622b, 1622c, 1622d), and the first to fourth holes (1622a, 1622b, 1622c, 1622d) may be formed at an equidistant gap from each distal end of the first and second internal portions (1612, 1622). Each hole (1622a, 1622b, 1622c, 1622d) or grooves at the second internal portion (1622) may correspondingly face or may be correspondingly formed to each hole (1612a, 1612b, 1612c, 1612d) or grooves at the first internal portion (1612).

For information, the first elastic member (1610) and the second elastic member (1620) are spaced apart and face each other, such that an opening (not shown) having a gap may be formed between a distal end of the first internal portion (1612) and a distal end of the second internal portion (1622), and between a distal end of the first external portion (1613) and a distal end of the second external portion (1623). An opening facing each distal end of the internal portion (1612, 1622) and an opening facing each distal end of the external portion (1613, 1623) may be arranged not in a mutually straight line but alternately arranged. Albeit not being illustrated in the drawing, the opening may be passed through by a bridge (not shown) for supporting the elastic member (1600) when the elastic member (1600) is manufactured, and the bridge may be removed by cutting to manufacture the elastic member (1600). When the bridge is removed from the elastic member (1600), the elastic member (1600) may be formed with a burr, where the burr may be inhibited from being formed by the cutting. The bridge may be formed in a combined shape of "¬" and "|", and the openings may be so arranged as to correspond to the bridge. However, the opening and the bridge are simply mentioned in a series of process for manufacturing the elastic member (1600) according to the second exemplary embodiment of the present invention, and the present invention is not limited thereto, and the elastic member (1600) may be variably manufactured depending on the manufacturer's intention.

Although FIG. 11 has illustrated that the holes (1612a, 1612b, 1612c, 1612d, 1622a, 1622b, 1622c, 1622d) include the first to fourth holes (1612a, 1612b, 1612c, 1612d, 1622a, 1622b, 1622c, 1622d), positions and number of holes (1612a, 1612b, 1612c, 1612d, 1622a, 1622b, 1622c, 1622d) may be variably changed depending on the manufacturer's intention as long as the holes are formed to correspond to the boss (1210) of the bobbin (1200) to allow the bobbin (1200) to be elastically supported relative to the housing (1100). That is, the holes (1612a, 1612b, 1612c, 1612d, 1622a, 1622b, 1622c, 1622d) or grooves may be formed in the number of two, three, four or more.

Meantime, the first internal portion (1612) may be such that a first connection portion (1611) is disposed between the second hole (1612b) and the third hole (1612c) and the second internal portion (1622) may be such that a second connection portion (1621) is disposed between the second hole (1622*b*) and the third hole (1622*c*), whereby each of the first and second connection portions (1611, 1621) may be respectively soldered with the first end portion (1310) and the second end portion (1320). If the distal ends of the first and second internal portions (1612, 1622) are respectively soldered to the first end portion (1310) and the second end portion (1320), the first end portion (1310) and the second end portion (1320) may be disconnected by the lifting up/down movement of the bobbin (1200).

The first external portion (1613) or the second external portion (1623) may be provided with a groove portion. In other words, the first external portion (1613) or the second external portion (1623) may be inwardly formed with a groove portion, i.e., a first avoidance portion (1630), in order to avoid the winding portion (1230) formed at the bobbin (1200).

Although FIG. 10 has illustrated only one winding portion (1230) and only one first avoidance portion (1630), this illustration is only to show an example of the present invention. For example, as illustrated in FIG. 11, although the position and number of the first avoidance portion (1630) formed at the first external portion (1613) or at the second external portion (1623) are illustrated to be two in the present exemplary embodiment, the position and number of the first avoidance portion (1630) may be variably provided depending on the manufacturer's intention, and the winding portion (1230) may be provided at the bobbin (1200) in correspondence to the first avoidance portion (1630).

The first internal portion (1612) or the second internal portion (1622) may be provided with a second avoidance portion (1640) in order to avoid the stopper (1220) formed at the bobbin (1200). Although FIG. 10 has illustrated four pieces of stoppers (1220) and second avoidance portions (1640) respectively, the illustration is intended to only show an example of the present invention. Referring to FIG. 11, the positions and number of the second avoidance portion (1640) formed at the first internal portion (1612) or the second internal portion (1622) may be variably provided depending on the manufacturer's intention, and the stopper (1220) may be also provided at the bobbin (1200) in correspondence to the second avoidance portion (1640).

The lens driving device according to the second exemplary embodiment of the present invention may further include a base (1400) and a support member (1600). Referring to FIG. 10, the base (1400) may be spaced apart from the housing (1100) from a bottom side of the housing (1100) at a predetermined distance.

The base (1400) may be such that each corner is formed with a pillar (not shown) and the housing (1100) is arranged at an inside of the pillar, wherein the base (1400) supports the housing (1100) through the elastic member (1600) interposed between the housing (1100) and the base (1400) by propping up the housing (1100) to allow the housing (1100) to move. The housing (1100) supported by the base (1400) can horizontally move as much as a distance less than a separated gap, because there is formed a gap between the housing (1100) and the pillar. The base (1400) may be formed with a hole (not shown) through which a light having passed the lens module can pass. A second coil (1500) and/or an FPCB (1950) may be further provided between the base (1400) and the housing (1100) (see FIG. 8).

The second coil (1500) may be arranged in opposition to the magnet (1110), and the second cil (1500) may be an OIS (Optical Image Stabilization) coil. The second coil (1500) may be formed with a plate shape, and may be formed with a hole for the lens module to pass a light. The second coil (1500) may perform a function of correcting a user's hand-shake by horizontally moving the bobbin (1200) and the housing (1100) mounted with the lens module. That is, when a current flow in the second coil (1500), a magnetic field may be formed on the second coil (1500) to horizontally move the housing (1100) and the bobbin (1200) accommodated into the housing through the electromagnetic interaction with the magnet (1110).

Figure 12:
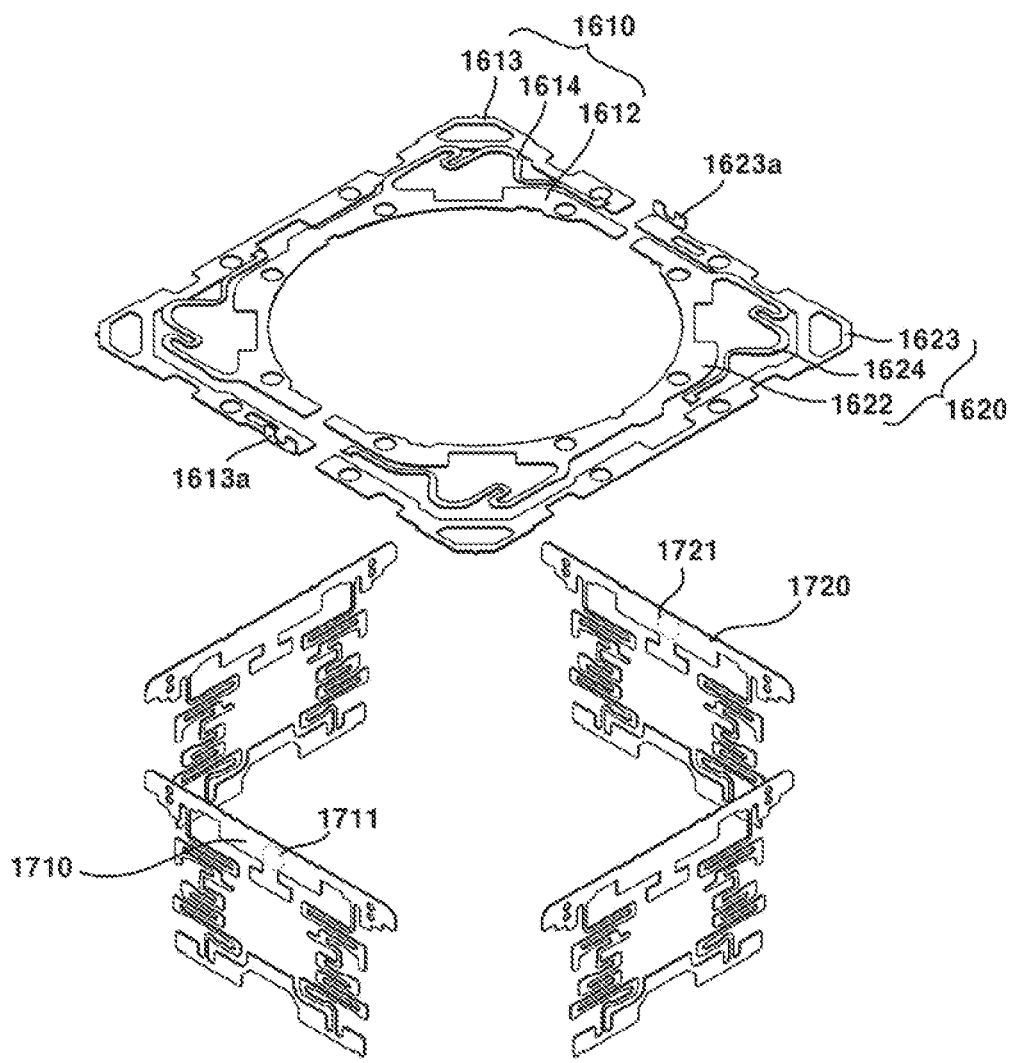
FIG. 12 is a lateral view illustrating a support member and an arranged state of the support member of a lens driving device according to a second exemplary embodiment of the present invention.

FIG. 12 is a lateral view illustrating a support member (1700) and an arranged state of the support member (1700) of a lens driving device according to a second exemplary embodiment of the present invention.

Referring to FIGS. 10 and 12, the support member (1700) may be disposed at an outside of the housing (1100), and may be provided in a plural number while elastically supporting the housing (1100) from the base (1400). The support member (1700) may be an OIS spring. The support member (1700) may restore the bobbin (1200) and the housing (1100) horizontally moved by the magnetic field of the second coil (1500) and the magnet (1110).

The support member (1700) may be respectively soldered to a part or an outside of a first external portion (1613) or a second external portion (1623). That is, the support member (1700) is electrically connected to the first external portion (1613) and the second external portion (1623), whereby the current transmitted to the elastic member (1600) through the first coil (1210) may be transmitted to the support member (1700). In other words, the first external portion (1613) and the second external portion (1623) may be protruded at each lug (1613*a*, 1623*a*) to an outside of a distal end in parallel with an optical axis, where the lugs (1613*a*, 1623*a*) may be soldered with the support member (1700) (see FIGS. 11 and 12).

Referring to FIG. 7, the base (1400) may be provided at an upper side with a cover can (1800) to an outside of the pillar, where the cover can (1800) can cover and protect a housing (1100), a bobbin (1200), a first coil (1300), a base (1400), a second coil (1500), elastic members (1600, 1900), a support member (1700) and an FPCB (1950).

Referring to FIG. 8, the elastic member (1600) may elastically support the housing (1100) from an upper side of the bobbin (1200), and the elastic member (1900) may elastically support the housing (1100) from a bottom side of the bobbin (1200) respectively. Furthermore, the lens driving device according to the second exemplary embodiment of the present invention may further comprise an FPCB (1950). The FPCB (1950) may be connected to an outside power and can supply a current to the first coil (1300) or the second coil (1500).

The lens driving device thus mentioned according to the second exemplary embodiment of the present invention may be applied to a camera module, where the camera module may be coupled to optical instruments, mobile devices or mobile phones, and may be also coupled to other electronic devices.

The above explanations are merely exemplary embodiments to implement the lens driving device, camera module and the optical instrument according to the present invention, and the present invention is not limited thereto, and thereby do not limit the scope of protection of the present invention.

Thus, it should be appreciated by the skilled in the art that changes, modifications and amendments to the above examples may be made without deviating from the scope of protection of the invention.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A lens driving device comprising:
a base;
a housing disposed on the base;
a bobbin disposed in the housing;
a magnet disposed on the housing;
a first coil disposed on the bobbin; and
a substrate comprising a body portion formed with a second coil and a terminal portion disposed on an outer lateral surface of the base,
wherein the base comprises first and second support portions protruding from the outer lateral surface of the base,
wherein the terminal portion of the substrate is disposed between the first support portion of the base and the second support portion of the base, and
wherein a lower end of each of the first and second support portions of the base is disposed higher than a lower end of the outer lateral surface of the base.

2. The lens driving device of claim 1, wherein an upper end of each of the first and second support portions of the base is disposed lower than an upper end of the outer lateral surface of the base.

3. The lens driving device of claim 1, wherein the first support portion of the base is configured to support one lateral surface of the terminal portion of the substrate, and
wherein the second support portion of the base is configured to support the other lateral surface of the terminal portion of the substrate.

4. The lens driving device of claim 1, wherein the outer lateral surface of the base comprises first and second outer lateral surfaces opposite to each other, and third and fourth outer lateral surfaces opposite to each other,
wherein the terminal portion of the substrate comprises first and second terminal portions disposed on the first and second outer lateral surfaces of the base, respectively.

5. The lens driving device of claim 4, wherein the base comprises four recesses formed on four corner areas of the base formed by the first to fourth outer lateral surfaces of the base, respectively.

6. The lens driving device of claim 5, comprising:
an upper elastic member coupled with the bobbin and an upper surface of the housing; and
a plurality of wires coupled with the upper elastic member at a position corresponding to the four recesses of the base.

7. The lens driving device of claim 6, comprising a first sensor configured to detect a movement or position of the bobbin.

8. The lens driving device of claim 7, comprising a printed circuit board (PCB) disposed with the first sensor,
wherein the PCB comprises four terminals, and
wherein the upper elastic member comprises four upper elastic members electrically connected with the four terminals of the PCB, respectively.

9. The lens driving device of claim 8, comprising a lower elastic member coupled with the bobbin and a lower surface of the housing,
wherein the lower elastic member comprises two lower elastic members electrically connected with the first coil.

10. The lens driving device of claim 1, comprising a cover member comprising an upper plate and a lateral plate extending from the upper plate,
wherein the lateral plate of the cover member is overlapped with the two protrusions in an optical axis direction.

11. The lens driving device of claim 10, wherein the lateral plate of the cover member comprises four lateral plates, and
wherein the first and second support portions of the base is spaced apart from four corners of the four lateral plates of the cover member.

12. The lens driving device of claim 1, comprising an adhesive fixing the terminal portion of the substrate to the base.

13. The lens driving device of claim 12, wherein the base comprises a terminal portion accommodating portion formed between the first and second support portions of the base, and
wherein the terminal portion of the substrate is disposed on the terminal portion accommodating portion of the base.

14. The lens driving device of claim 13, wherein the base comprises an adhesive accommodating groove formed on the terminal portion accommodating portion of the base, and wherein at least a part of the adhesive is disposed on the adhesive accommodating groove of the base.

15. The lens driving device of claim 1, wherein a horizontal width of the terminal portion of the substrate corresponds to a distance between the first and second support portions of the base.

16. The lens driving device of claim 1, wherein the terminal portion of the substrate downwardly protrudes further than the lower end of each of the first and second support portions of the base.

17. A camera module, comprising:
the lens driving device of claim 1;
a printed circuit board (PCB) disposed under the lens driving device; and
an image sensor disposed on the PCB.

18. An optical instrument, comprising:
the camera module of claim 17;
a main body disposed with the camera module; and
a display portion disposed at one surface of the main body to output an image captured by the camera module.

19. A lens driving device comprising:
a base;
a cover member comprising a lateral plate disposed on the base;
a bobbin disposed in the cover member;
a housing disposed between the cover member and the bobbin;
a magnet disposed on the housing;
a first coil disposed on the bobbin; and
a substrate comprising a body portion formed with a second coil and a terminal portion disposed on an outer lateral surface of the base,
wherein the base comprises first and second support portions protruding from the outer lateral surface of the base,
wherein the terminal portion of the substrate is disposed between the first support portion of the base and the second support portion of the base,
wherein the lateral plate of the cover member comprises four lateral plates, and
wherein the first and second support portions of the base are spaced apart from four corners of the four lateral plates of the cover member.

20. The lens driving device of claim 19, wherein a lower end of each of the first and second support portions of the base is disposed higher than a lower end of the outer lateral surface of the base, and
wherein an upper end of each of the first and second support portions of the base is disposed lower than an upper end of the outer lateral surface of the base.

* * * * *